(12) United States Patent
Hanson

(10) Patent No.: US 11,412,392 B2
(45) Date of Patent: Aug. 9, 2022

(54) DISTRIBUTED RELAY NODE

(71) Applicant: CommScope Technologies LLC, Hickory, NC (US)

(72) Inventor: Van Erick Hanson, Forest, VA (US)

(73) Assignee: CommScope Technologies LLC, Hickory, NC (US)

(*) Notice: Subject to any disclaimer, the term of this patent is extended or adjusted under 35 U.S.C. 154(b) by 70 days.

(21) Appl. No.: 16/859,233

(22) Filed: Apr. 27, 2020

(65) Prior Publication Data

US 2020/0382349 A1  Dec. 3, 2020

Related U.S. Application Data

(60) Provisional application No. 62/853,867, filed on May 29, 2019, provisional application No. 62/853,854, filed on May 29, 2019.

(51) Int. Cl.
*H04W 16/26* (2009.01)
*H04W 72/04* (2009.01)
(Continued)

(52) U.S. Cl.
CPC ........ *H04W 16/26* (2013.01); *H04B 7/15507* (2013.01); *H04L 27/144* (2013.01);
(Continued)

(58) Field of Classification Search
CPC ............. H04W 16/26; H04W 7/15507; H04W 27/144; H04W 72/048; H04W 88/085; H04W 88/14; H04W 84/20; H04W 92/24
(Continued)

(56) References Cited

U.S. PATENT DOCUMENTS 9,179,501 B2   11/2015   Ko
9,467,876 B2   10/2016   Kummetz et al.
(Continued)

FOREIGN PATENT DOCUMENTS

EP    2268096 A2    12/2010
WO    2011115347 A1    9/2011

OTHER PUBLICATIONS

International Searching Authority, "International Search Report and Written Opinion from PCT Application No. PCT/US2020/030059 dated Aug. 6, 2020", From PCT Counterpart of U.S. Appl. No. 16/859,233; pp. 1 through 16; Published in WO.
(Continued)

*Primary Examiner* — Obaidul Huq
(74) *Attorney, Agent, or Firm* — Fogg & Powers LLC

(57) ABSTRACT

In an example, a distributed relay includes a relay node master unit communicatively coupled to a base station; and one or more remote relay antenna units located remotely from the relay node master unit and communicatively coupled to the relay node master unit. The relay node master unit is configured to communicate demodulated and decoded data and/or demodulated data with the one or more remote relay antenna units via one or more transport interfaces, and the one or more remote relay antenna units are configured to communicate radio frequency signals to a coverage zone via one or more antennas. The relay node master unit includes a backhaul interface and an access interface. The backhaul interface is configured to implement communications between the relay node master unit and the base station. The access interface is configured to implement communications between the one or more remote relay antenna units and user equipment.

25 Claims, 10 Drawing Sheets

(51) Int. Cl.
*H04B 7/155* (2006.01)
*H04L 27/144* (2006.01)
*H04W 88/08* (2009.01)
*H04W 88/14* (2009.01)
*H04W 84/20* (2009.01)
*H04W 92/24* (2009.01)

(52) U.S. Cl.
CPC ....... *H04W 72/048* (2013.01); *H04W 88/085* (2013.01); *H04W 88/14* (2013.01); *H04W 84/20* (2013.01); *H04W 92/24* (2013.01)

(58) Field of Classification Search
USPC ........................................ 370/310, 328, 329
See application file for complete search history.

(56) References Cited

U.S. PATENT DOCUMENTS

| | | | |
|---|---|---|---|
| 2009/0279456 A1 | 11/2009 | Lee et al. | |
| 2012/0329523 A1* | 12/2012 | Stewart | H04B 1/525 455/562.1 |
| 2013/0051317 A1 | 2/2013 | Ji et al. | |
| 2014/0248920 A1 | 9/2014 | Venkatachari et al. | |
| 2015/0249513 A1* | 9/2015 | Schwab | H04B 7/024 370/278 |
| 2018/0123677 A1* | 5/2018 | Hanson | H04W 92/02 |
| 2019/0124696 A1 | 4/2019 | Islam et al. | |
| 2020/0382966 A1 | 12/2020 | Hanson | |

OTHER PUBLICATIONS

International Searching Authority, "International Search Report and Written Opinion from PCT Application No. PCT/US2020/030065 dated Aug. 7, 2020", From PCT Counterpart of U.S. Appl. No. 16/859,284; pp. 1 through 16; Published in WO.

U.S. Patent and Trademark Office, "Office Action", U.S. Appl. No. 16/859,284, dated Oct. 6, 2021, pp. 1 through 27, Published: US.

U.S. Patent and Trademark Office, "Final Office Action", U.S. Appl. No. 16/859,284, dated Apr. 22, 2022, pp. 1 through 32, Published: U.S.

* cited by examiner

DISTRIBUTED RELAY NODE

CROSS-REFERENCE TO RELATED APPLICATIONS

This application claims the benefit of U.S. Provisional Application Ser. No. 62/853,854, filed May 29, 2019, and titled "DISTRIBUTED RELAY NODE," and U.S. Provisional Application Ser. No. 62/853,867, filed May 29, 2019, and titled "INTEGRATED RELAY DISTRIBUTED ANTENNA SYSTEM," which are hereby incorporated herein by reference.

BACKGROUND

Radio frequency repeaters, which are also referred to as layer 1 (L1) relays or amplify-and-forward relays, are commonly used to extend the coverage range of radio communication systems. In the downlink, radio signals from a donor base station are received by the repeater, filtered, amplified, and retransmitted to user equipment (UE). Corresponding functions are performed in the uplink for radio signals from the UEs to the base station(s). Radio frequency repeaters are designed to maintain transparency of the modulation of the radio frequency signals because it is generally desired to retransmit radio frequency signals with modulation identical to the received signals and to minimize any noise or distortion introduced in the repeater. If the added noise and/or distortion of the repeated signal is too high, then the receiver of the repeated signal may not be able to decode the repeated signal properly.

It is also desired for a repeater to minimize delay of the repeated signal through the repeater because communication between the donor base station and mobile station may not be possible if the delay is too long. Often, the base station expects uplink signals from the mobile station to be received within a certain time window relative to the downlink signal, and additional delay introduced by a repeater can cause uplink signals to exceed the allowed time window. Typically, repeaters are not visible to the wireless service provider's radio access network (RAN) and core network as first-class nodes of the network. The wireless protocol entities in the RAN (for example, the L2 schedulers) typically do not know of the existence of any repeaters and do not take them into account directly. Instead, any impact a repeater has on the operation of the wireless protocols is indirect since a repeater will appear to be either a part of the antenna or a part of the radio frequency channel. Also, repeaters typically do not implement the security and other protocols necessary for decoding the control-plane and user-plane communications for the wireless interfaces; instead, to the extent that a repeater needs access to control-plane information (for example, TDD switching information), a repeater must either infer that information or be provided that information out-of-band (for example, via an out-of-band connection with a base station).

To overcome the limitations of an amplify-and-forward relay or repeater, a decode-and-forward relay, which can be realized as a layer 2 (L2) or layer 3 (L3) relay, can be used to extend the coverage range of a base station. A decode-and-forward relay receives, demodulates, and decodes the data that is modulated on the radio frequency signal from a base station (or mobile station in the uplink direction). A decode-and-forward relay also encodes, modulates, and transmits data to mobile stations (or base stations in the uplink direction). The data sent between the base station and mobile station can be modified by the relay in a manner that allows the connection between the base station and mobile station to be maintained.

One advantage of a decode-and-forward relay is that any noise in the received signal is removed from the retransmitted signal as long as the receive signal can be successfully decoded. Also, although the delay in a decode-and-forward relay is higher than an amplify-and-forward relay due to the decoding/encoding operations, the effect of additional propagation and processing delay can in large part be eliminated by designing the communication protocol to accommodate these delays. For instance, the 3GPP LTE standard has defined the operation of Type 1 Relay Nodes, which are a type of L3 relay.

In contrast to repeaters, a relay is considered a first-class node in the RAN and core network. The wireless protocol entities in the RAN (for example, the L2 schedulers) typically know of the existence of any relays and the relays are taken into account directly in carrying out protocol processing (for example, in making scheduling decisions). Also, relays typically implement the security and other protocols necessary for them to decode the control-plane and user-plane communications for the wireless interface; as a result, relays have direct access to any control-plane information it may need (such as TDD switching information and scheduling information indicating which resource blocks are assigned to a given UE for a given Transmission Time Interval (TTI)).

Single-point repeaters and relays are typically designed such that they are connected to a single donor antenna and a single coverage antenna, which are located nearby the repeater/relay (tens of meters). For instance, the antennas could be located at different heights on the same tower, or the donor antenna on the roof of a building and the coverage antenna inside a building. Alternatively, repeaters can be implemented as a "distributed antenna system" or multi-point repeater having multiple remote antenna units distributed throughout a building or coverage area, with each such remote antenna unit including or being coupled to a respective one or more coverage antennas. Also, a single-point repeater can be used with a DAS. In such an application, instead of being connected to a coverage antenna, the coverage port of the single-point repeater is connected to a donor port of a master unit of the distributed antenna system, where the downlink signal is distributed to a plurality of remote antenna units. In the uplink direction, the signals from all the remote antenna units are combined and sent to the single-point repeater. This is advantageous in situations where a single antenna does not provide sufficient coverage due to obstructions.

SUMMARY

In an example, a distributed relay comprises: a relay node master unit communicatively coupled to a base station; and one or more remote relay antenna units located remotely from the relay node master unit and communicatively coupled to the relay node master unit, wherein the relay node master unit is configured to communicate demodulated and decoded data and/or demodulated data with the one or more remote relay antenna units via one or more transport interfaces, wherein the one or more remote relay antenna units are configured to communicate radio frequency signals to a coverage zone via one or more antennas; wherein the relay node master unit comprises a backhaul interface and an access interface, wherein the backhaul interface is configured to implement communications between the relay node master unit and the base station, wherein the access interface is configured to implement communications between the one or more remote relay antenna units and user equipment.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
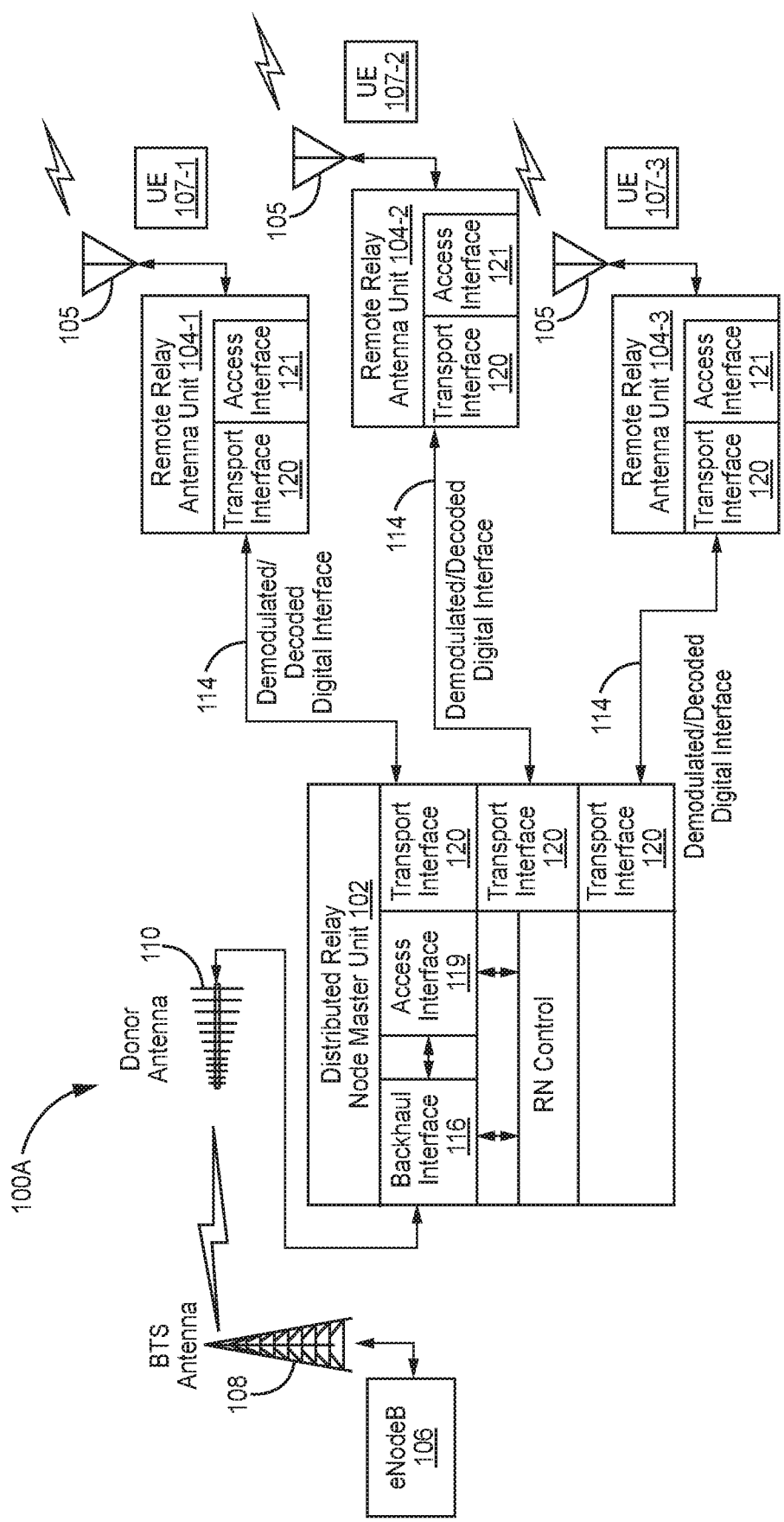
FIGS. 1A-1B are block diagrams of example distributed relays.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

Distributed Relay Node

Figure 1B:
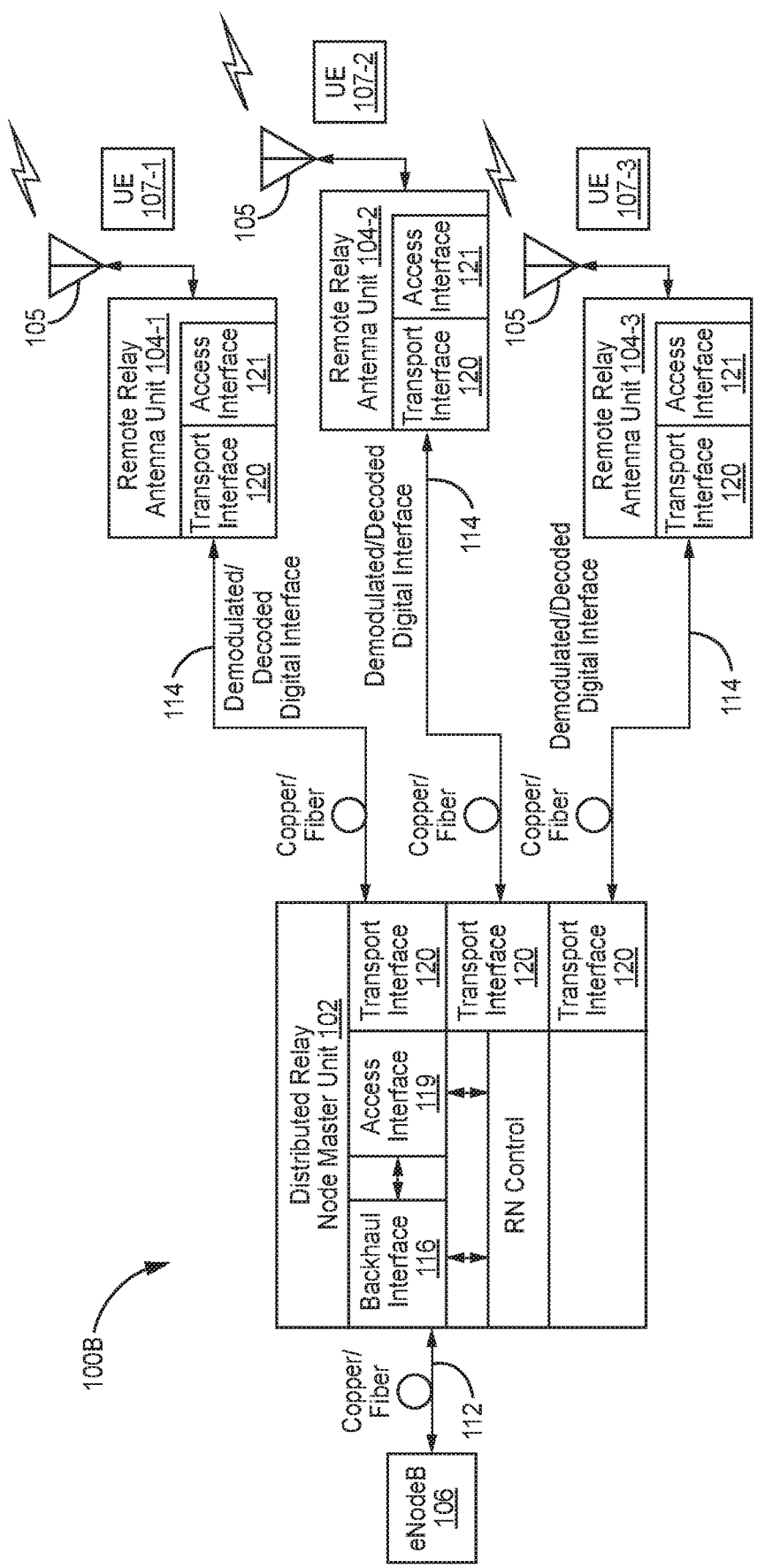

FIGS. 1A-1B are block diagrams of an example distributed relay 100A, 100B. In the example shown in FIGS. 1A-1B, the distributed relay 100A, 100B (also referred to as "distributed relay node") includes a relay node master unit 102 (also referred to as "distributed relay node master unit") and three remote relay antenna units 104. It should be understood that different numbers of relay node master units 102 or remote relay antenna units 104 can be used depending on the desired performance or needs of the system or application. The distributed relay 100A, 100B can be deployed at a site to provide wireless coverage and capacity for one or more wireless network operators. The site may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

The relay node master unit 102 is communicatively coupled to one or more base stations 106 (for example, one or more eNode-Bs). In some examples, such as the example shown in FIG. 1A, the relay node master unit 102 is wirelessly coupled to the base station 106 via one or more donor antennas 110. In such examples, the donor antennas 110 can be positioned on the roof of a building or other location to improve reception of the signals from the antenna 108 of the base station 106.

In other examples, such as the example shown in FIG. 1B, the relay node master unit 102 is directly connected to the base station 106. The relay node master unit 102 can be directly connected to the base station 106 (or to a portion thereof such as a baseband unit) using copper cabling or optical fiber, for example. A direct connection 112 between the relay node master unit 102 and the base station 106 can be beneficial in installations where there is not a radio frequency path between the base station 106 and relay node master unit 102, such as, for example, on a university or corporate campus where a large amount of base stations are located at a base station hotel.

In some examples, the distributed relay 100A, 100B is configured to operate as an in-band distributed relay where radio frequency signals are communicated over the access interface between the remote relay antenna units 104 of the distributed relay 100A, 100B and user equipment (UE) 107 served by the distributed relay 100A, 100B using the same carrier frequency that the base station 106 uses to communicate radio frequency signals over the backhaul interface between the base station 106 and the relay node master unit 102. In such examples, the base station 106 is aware that signals are being communicated to those UEs 107 via a relay, and the distributed relay 100A, 100B is configured with sufficient isolation between the donor antenna 110 and the coverage antennas 105 and/or, in the case where the distributed relay 100A, 100B operates as Type 2 relay, the operation of the in-band distributed relay 100A, 100B is controlled such that different resource blocks are used for communicating over the backhaul interface between the donor base station 106 and the distributed relay node 100A, 100B and for communicating over the access interface established between the distributed relay node 100A, 100B and the UEs 107 served by the distributed relay node 100A, 100B.

In other examples, the distributed relay node 100A, 100B is configured to operate as an out-of-band distributed relay where radio frequency signals are communicated over the access interface established between remote relay antenna units 104 of the distributed relay 100A, 100B and the UE 107 using a different carrier frequency than is used by the base station 106 to communicate radio frequency signals over the backhaul interface established between the base station 106 and the relay node master unit 102. In such examples, the base station 106 is aware that signals are being communicated to UEs 107 via a relay that communicates using a different frequency band.

The remote relay antenna units 104 are located remotely from and communicatively coupled to the relay node master units 102 of the distributed relay 100A, 100B. In some examples, the relay node master unit 102 is communicatively coupled to each of the remote relay antenna units 104 via one or more cables 114. In some examples, the cables 114 can include one or more optical or copper cables that comply with the Category 5, Category 5e, Category 6, Category 6A, or Category 7 specifications. Future communication medium specifications used for Ethernet or other protocols are also within the scope of the present disclosure. Each remote relay antenna unit 104 is coupled to or includes one or more antennas 105.

The components of the distributed relay 100A, 100B are configured to perform conventional processing for implementing a decode-and-forward relay. In particular, the components of the distributed relay 100A, 100B are configured to communicate with the base station 106 over the backhaul interface and communicate with the UEs 107 served by the distributed relay 100A, 100B over the access interface. However, in contrast to a single-point decode-and-forward relay, the distributed relays 100A, 100B shown in FIGS. 1A-1B include a relay node master unit 102 and a plurality of remote relay antenna units 104 where the functionality for performing the conventional processing for implementing a decode-and-forward relay is distributed among the relay node master unit 102 and the remote relay antenna units 104 and data is communicated between the relay node master unit 102 and the remote relay antenna units 104 over a digital interface in order to support such distributed processing. As a result, a UE 107 can be served using multiple remote relay antenna units 104. That is, downlink resource blocks intended for a given UE 107 can be simulcast from multiple remote relay antenna units 104, and uplink resource blocks transmitted from a given UE 107 can be received via multiple remote relay antenna units 104 (where, in the case of uplink resource blocks, the associated baseband data can be combined in connection with performing receiver processing for those resource blocks).

In the example shown in FIGS. 1A-1B, the distributed relay 100A, 100B includes backhaul interface circuity 116 (also referred to here simply as the "backhaul interface 116") and access interface circuitry 118 (also referred to here simply as the "access interface 118"). The backhaul interface circuitry 116 implements the wireless backhaul interface established between the base station 106 and the distributed relay and the access interface circuitry 118 implements the wireless access interface established between the distributed relay 100A, 100B and the UEs 107 served by the distributed relay 100A, 100B. In some examples, the wireless backhaul interface comprises the LTE-Un interface, and the wireless access interface comprises the LTE-Uu interface.

In addition to the "external" interfaces (the backhaul interface 116 and the access interfaces 118) used for wirelessly communicating with entities deployed outside of the distributed relay 100A, 100B, the distributed relay 100A, 100B includes transport interfaces 120 to enable communication between the relay node master unit 102 and the remote relay antenna units 104 over the cables 114 and to accommodate the split of functionality among the relay node master unit 102 and the remote relay antenna units 104. In an example where the relay node master unit 102 is coupled to a particular remote relay antenna unit 104 using one or more fiber cables, the respective transport interfaces 120 in the relay node master unit 102 and in that remote relay antenna unit 104 are configured for communicating over the fiber cables using appropriate communication protocols (for example, one or more Gigabit Ethernet protocols). In an example where the relay node master unit 102 is coupled to a particular remote relay antenna unit 104 using one or more copper cables, the respective transport interfaces 120 in the relay node master unit 102 and in that remote relay antenna unit 104 are configured for communicating over the copper cables using appropriate communication protocols (for example, one or more Gigabit Ethernet protocols).

A scheduler/control circuit is configured to process, schedule, and forward data received via one of the interfaces 116 or 118 to the other one of the other interfaces 116 or 118 as necessary to implement the associated type of relay node. In some examples, the division of components included in the backhaul interface 116 and access interface 118 may vary between implementations.

Figure 2:
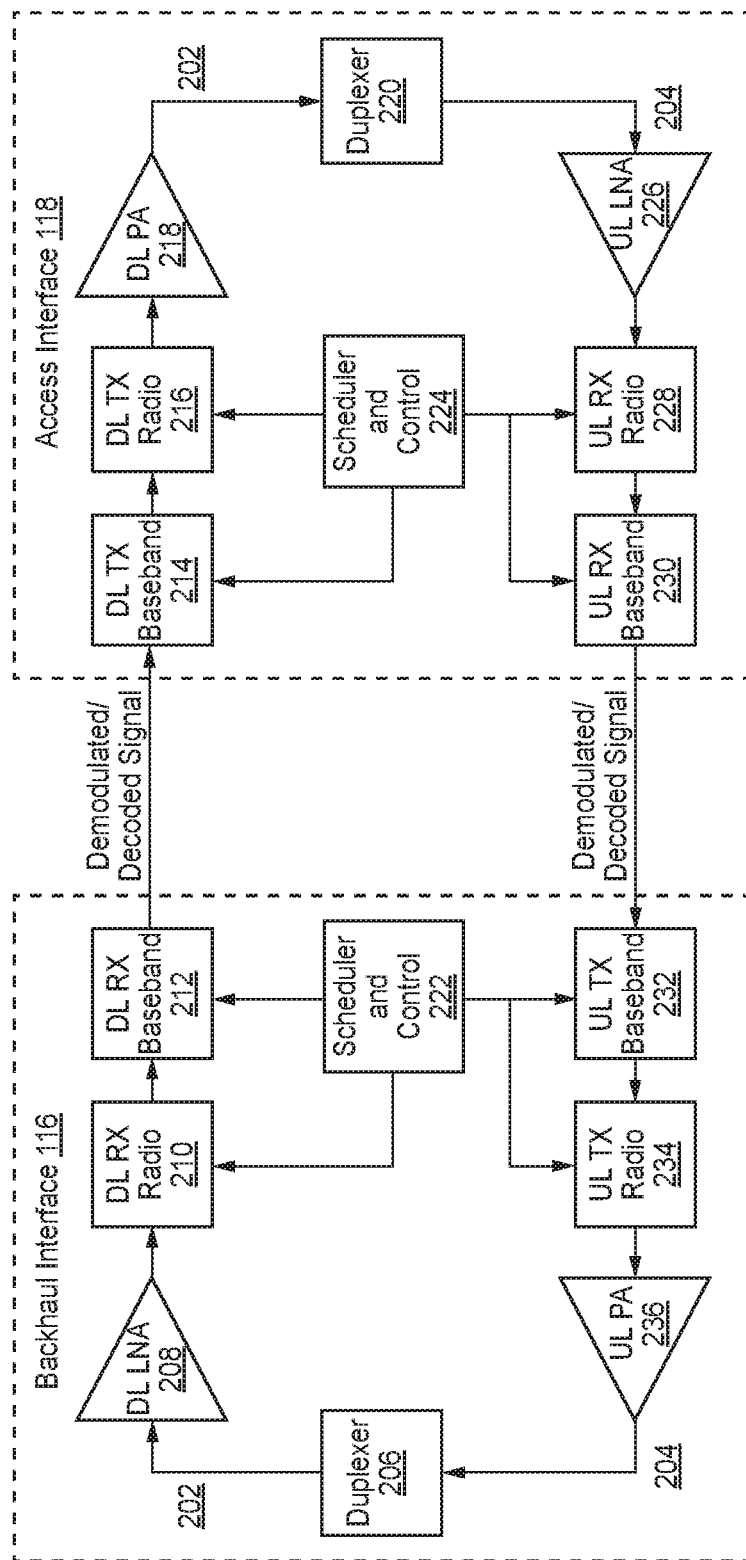
FIG. 2 is a block diagram of an example interfaces of a distributed relay.

FIG. 2 is a block diagram illustrating one exemplary embodiment of backhaul interface circuitry 116 and access interface circuitry 118. In FIG. 2, the transport interfaces 120 and the split in functionality between the relay node master unit 102 and the remote relay antenna units 104 are not shown for ease of illustration. In the example shown in FIG. 2, the backhaul interface circuitry 116 includes a duplexer 206 for each donor antenna 110, each duplexer 206 having an antenna port that is coupled to respective donor antenna 110, a downlink port coupled to the downlink path 202, and an uplink port coupled to the uplink path 204. In the example shown in FIG. 2, in the downlink path 202, the backhaul interface circuitry 116 includes components of a receiver such as a low-noise amplifier 208, a receiver radio processing circuit 210, and a receiver baseband processing circuit 212. In some examples, the receiver radio processing circuit 210 down converts and digitizes the downlink radio frequency signals received via each donor antenna 110. In some examples, down converting and digitizing the downlink radio frequency signals includes down converting the downlink radio frequency signals in the analog domain. In some such examples, down converting and digitizing the downlink radio frequency signals includes also includes digitally down converting the digitized signals after also down converting the signals in the analog domain. In other examples, the receiver radio processing circuit 210 digitizes the downlink radio frequency signals (for example, using a high-speed radio frequency analog-to-digital converter) and digitally down converts the digitized signals.

In some examples, the baseband processing circuit 212 demodulates, decodes, and otherwise processes the resulting downlink baseband data output by the receiver radio processing circuit 210 in order to recover the control-plane and user-plane data communicated from the donor base station 106 to the distributed relay 100A, 100B over the wireless backhaul interface. The recovered downlink control-plane and user-plane data is provided to the access interface circuitry 118.

In the example shown in FIG. 2, the backhaul interface circuitry 116 includes, in the uplink path 204, components of a transmitter such as a transmitter baseband processing circuit 232, a transmitter radio processing circuit 234, and a power amplifier 236. In some examples, the transmitter baseband processing circuit 232 receives uplink control-plane and user-plane data output by the access interface circuitry 118 and performs encoding, modulation, and other baseband processing necessary to produce baseband data from the control-plane and user-plane data that is scheduled to be transmitted by the relay node 100A, 100B to the donor base station 106 over the wireless backhaul interface, and the transmitter radio processing circuit 234 digital-to-analog converts and upconverts the resulting baseband data output by the transmitter baseband processing circuit 232 in order to produce uplink analog RF signals suitable for communication over the wireless backhaul interface. In some examples, the transmitter radio processing circuit 234 digitally upconverts the uplink baseband data to radio frequency and then performs a digital-to-analog conversion (for example, using a high-speed radio frequency digital-to-analog converter). In other examples, digital-to-analog converting and upconverting the resulting baseband data includes up converting the uplink signals in the analog domain. In some such examples, digital-to-analog converting and upconverting the resulting baseband data also includes digitally up converting the baseband data prior to performing the digital-to-analog conversion. The power amplifier 236 amplifies the uplink analog RF signals output by the transmitter radio processing circuit 234, and the resulting amplified uplink analog RF signals are coupled to the donor antennas 110 via the duplexer 206 for wireless communication to the donor base station 106.

In the example shown in FIG. 2, the access interface circuitry 118 includes, in the downlink path 202, components of a transmitter such as a transmitter baseband processing circuit 214, a transmitter radio processing circuit 216, and a power amplifier 218. In some examples, the transmitter baseband processing circuit 214 receives downlink control-plane and user-plane data output by the backhaul interface circuitry 116 and encodes, modulates, and otherwise processes the control-plane and/or user-plane data that is scheduled to be communicated to each served UE 107 over the wireless access interface and the transmitter radio processing circuit 216 digital-to-analog converts and upconverts the resulting baseband data output by the baseband processing circuit 214 in order to produce downlink analog RF signals suitable for communication over the wireless access interface. In some examples, the transmitter radio processing circuit 216 digitally upconverts the downlink baseband data to radio frequency and then performs a digital-to-analog conversion (for example, using a high-speed radio frequency digital-to-analog converter). In other examples, digital-to-analog converting and upconverting the resulting baseband data includes up converting the uplink signals in the analog domain. In some such examples, digital-to-analog converting and upconverting the resulting baseband data also includes digitally up converting the baseband data prior to performing the digital-to-analog conversion. In the example shown in FIG. 2, the access interface circuitry 118 similarly includes a duplexer 220 for each coverage antenna 105, each duplexer 220 includes an antenna port coupled to the coverage antenna 105, a downlink port coupled to the downlink path 202, and an uplink port coupled to the uplink path 204. The power amplifier 218 amplifies the downlink analog RF signals output by the transmitter radio processing circuit 216, and the resulting amplified downlink analog RF signals are coupled to the coverage antennas 105 via the duplexer 220.

In the example shown in FIG. 2, the access interface circuitry 118 also includes, in the uplink path 204, components of a receiver such as a low-noise amplifier 226, a receiver radio processing circuit 228, and a receiver baseband processing circuit 230. In some examples, the receiver radio processing circuit 228 down converts and digitizes the uplink radio frequency signals received via the coverage antennas 105. In some examples, down converting and digitizing the downlink radio frequency signals includes down converting the downlink radio frequency signals in the analog domain. In some such examples, down converting and digitizing the downlink radio frequency signals includes also includes digitally down converting the digitized signals after also down converting the signals in the analog domain. In other examples, the receiver radio processing circuit 210 digitizes the downlink radio frequency signals (for example, using a high-speed radio frequency analog-to-digital converter) and digitally down converts the digitized signals.

In some examples, the receiver baseband processing circuit 230 demodulates, decodes, and otherwise processes the resulting uplink baseband data output by the receiver radio processing circuit 228 in order to recover the control-plane and user-plane data communicated from each UE 107 to the distributed relay 100A, 100B over the wireless access interface. The recovered uplink control-plane and user-plane data is provided to the backhaul interface circuitry 116.

As shown in FIGS. 1A-1B, the access interface 118 of the distributed relay 100A, 100B is divided and distributed between the relay node master unit 102 and the remote relay antenna units 104 (access interfaces 119 and 121, respectively). The exact distribution of the components or functionality of access interface 118 between the relay node master unit 102 and the remote relay antenna units 104 can vary depending on the implementation. In other examples, the access interface 118 of the distributed relay 100A, 100B is implemented entirely in the remote relay antenna units 104. Also, as shown in FIGS. 1A-1B, the backhaul interface circuitry 116 of the distributed relay 100A, 100B is implemented entirely in the relay node master unit 102. In other examples, the backhaul interface circuitry 116 of the distributed relay 100A, 100B is divided between the relay node master unit 102 and the remote relay antenna units 104.

As noted above, in the examples shown in FIGS. 1A-1B, the backhaul interface circuitry 116 is implemented entirely in the relay node master unit 102. That is, the backhaul interface circuitry 116 in the relay node master unit 102 both demodulates and decodes the corresponding downlink baseband data generated for the downlink signals received via the wireless backhaul interface and both encodes and modulates the corresponding uplink baseband data generated for the uplink signals to be transmitted via the wireless backhaul interface. As a result, the data communicated in the downlink direction over the transport cables 114 between the relay node master unit 102 and the remote relay antenna units 104 is produced after the corresponding downlink baseband data generated for the downlink signals received via the wireless backhaul interface has been both demodulated and decoded and is referred to here as "demodulated and decoded" data.

Also, as noted, in the examples shown in FIGS. 1A-1B, the access interface circuitry 118 is distributed between the relay node master unit and the remote relay antenna units 104. In one example, the access interface circuitry 119 in the relay node master unit 102, for at least some of the downlink physical channels, encodes the corresponding downlink baseband data, whereas the access interface circuitry 121 in each remote relay antenna unit 104 performs the modulation for those downlink channels. In such an example, the access interface circuitry 121 in each remote relay antenna unit 104, for at least some of the uplink physical channels, demodulates the corresponding uplink baseband data generated for the uplink signals received via the wireless access interface whereas the access interface circuitry 119 in the relay node master unit 102 performs the decoding for those uplink channels. As a result, in such an example, the data communicated in the uplink direction for those uplink physical channels over the transport cables 114 between the remote relay antenna units 104 and the relay node master unit 102 is produced after the corresponding data received via the wireless access interface has been demodulated but not yet decoded and is therefore referred to here as "demodulated" data.

In another example, the access interface circuitry 121 in each remote relay antenna unit 104, for at least some of the downlink physical channels, both encodes and modulates the corresponding downlink baseband data for those downlink channels. In such an example, the access interface circuitry 121 in each remote relay antenna unit 104, for at least some of the uplink physical channels, both demodulates and decodes the corresponding uplink baseband data generated for the uplink signals received via the wireless access interface for those uplink channels. As a result, in such an example, the data communicated in the uplink direction for those uplink physical channels over the transport cables 114 between the remote relay antenna units 104 and the relay node master unit 102 is produced after the corresponding data received via the wireless access interface has been both demodulated and decoded and is therefore referred to here as "demodulated and decoded" data.

Rather than transporting analog radio frequency or digitized radio frequency signals over the cables 114 as in a typical DAS implementation, the distributed relay 100A, 100B transports data between the relay node master unit 102 and remote relay antenna units 104 as either "demodulated and decoded" data or "demodulated" data. This enables the use of lower speed interfaces for the distributed relay compared to a digitized radio frequency interface used in a DAS. It is noted that transporting "demodulated and decoded" data provides the greatest benefit in this regard, but transporting "demodulated" data enables the use of lower data rates compared to the analog radio frequency or digitized radio frequency links of a typical distributed antenna system. However, it is to a lesser extent compared to communicating "demodulated and decoded" data between the relay node master unit 102 and the remote relay antenna units 104. Moreover, the "demodulation" referred to here in connection with the phrases "demodulated" data and "demodulated and decoded" data is not simply generating analog or digital in-phase (I) and quadrature (Q) signals or data but instead refers to the extraction or recovery of the encoded data communicated in accordance with a particular modulation scheme (for example, quadrature phase-shift keying (QPSK), 16-phase quadrature amplitude modulation (16QAM), or 64-state quadrature amplitude modulation (64QAM)).

The scheduler/control circuit of the distributed relay 100A, 100B is also distributed between the relay node master unit 102 and remote relay antenna units 104. In some examples, the scheduler/control circuit 222 of the backhaul interface 116 and/or the scheduler/control circuit 224 of the access interface 119 of the relay node master unit 102 can be configured to control routing of downlink data to the remote relay antenna units 104 and to modify some of the control information in the downlink data. Similarly, in some examples, the scheduler/control circuit 224 of the access interface 121 of the remote relay antenna units 104 can be configured to modify the routing of uplink data to the relay node master unit 102 and modify some of the control information in the uplink data. Further modification of the control information of downlink data and the uplink data can also be performed by the access interfaces 121, 119 at the remote relay antenna unit 104 and relay node master unit 102, if desired. In some examples, the scheduler/control circuit 222 of the backhaul interface 116 is integrated with the receiver baseband processing circuit 212 and/or the transmitter baseband processing circuit 232. Similarly, in some examples, the scheduler/control circuit 224 of the access interface 118 is integrated with the receiver baseband processing circuit 230 and/or the transmitter baseband processing circuit 214.

Figure 3A:
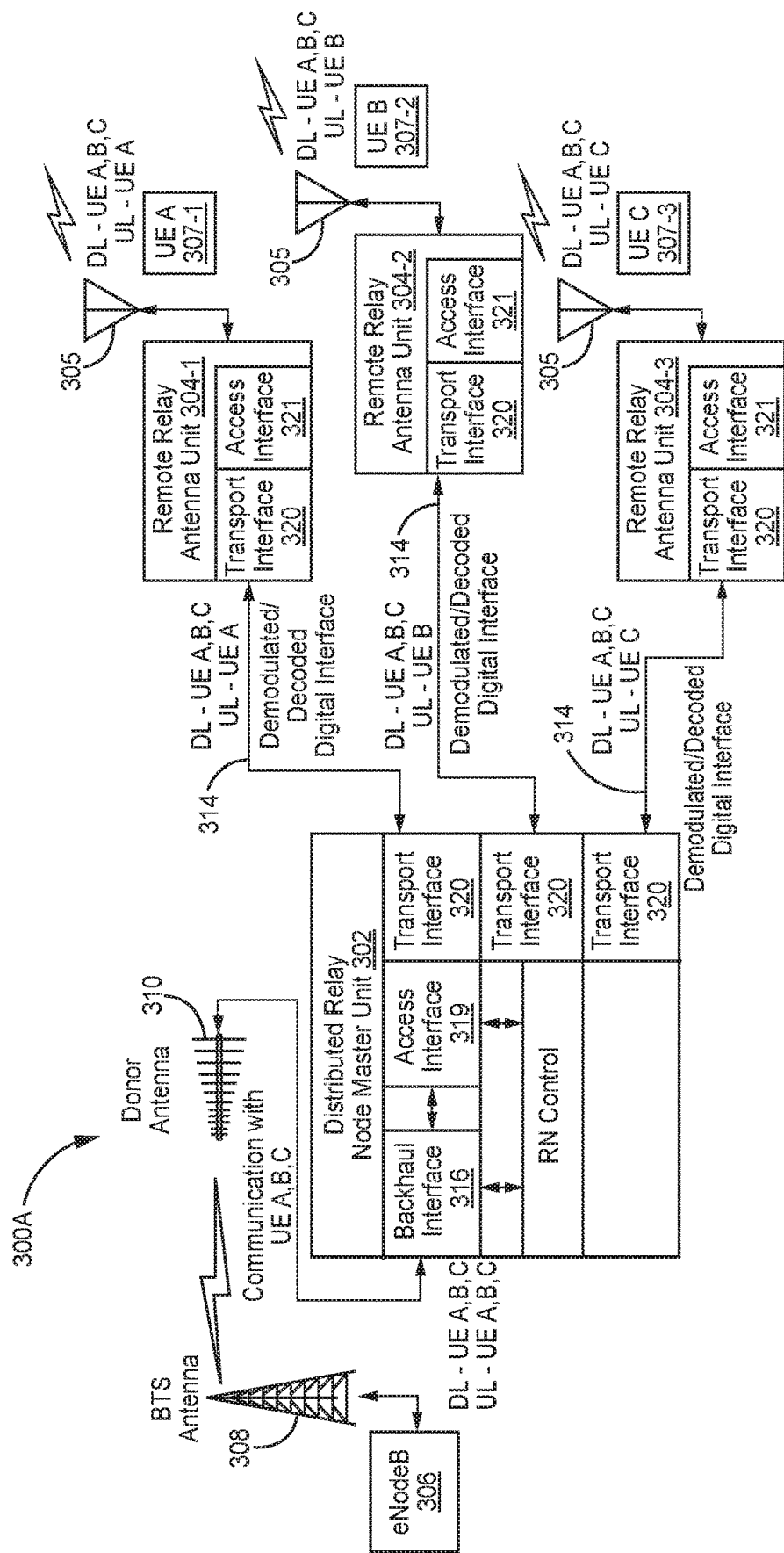
FIGS. 3A-3B are block diagrams of example distributed relays using particular communication schemes.
Figure 3B:
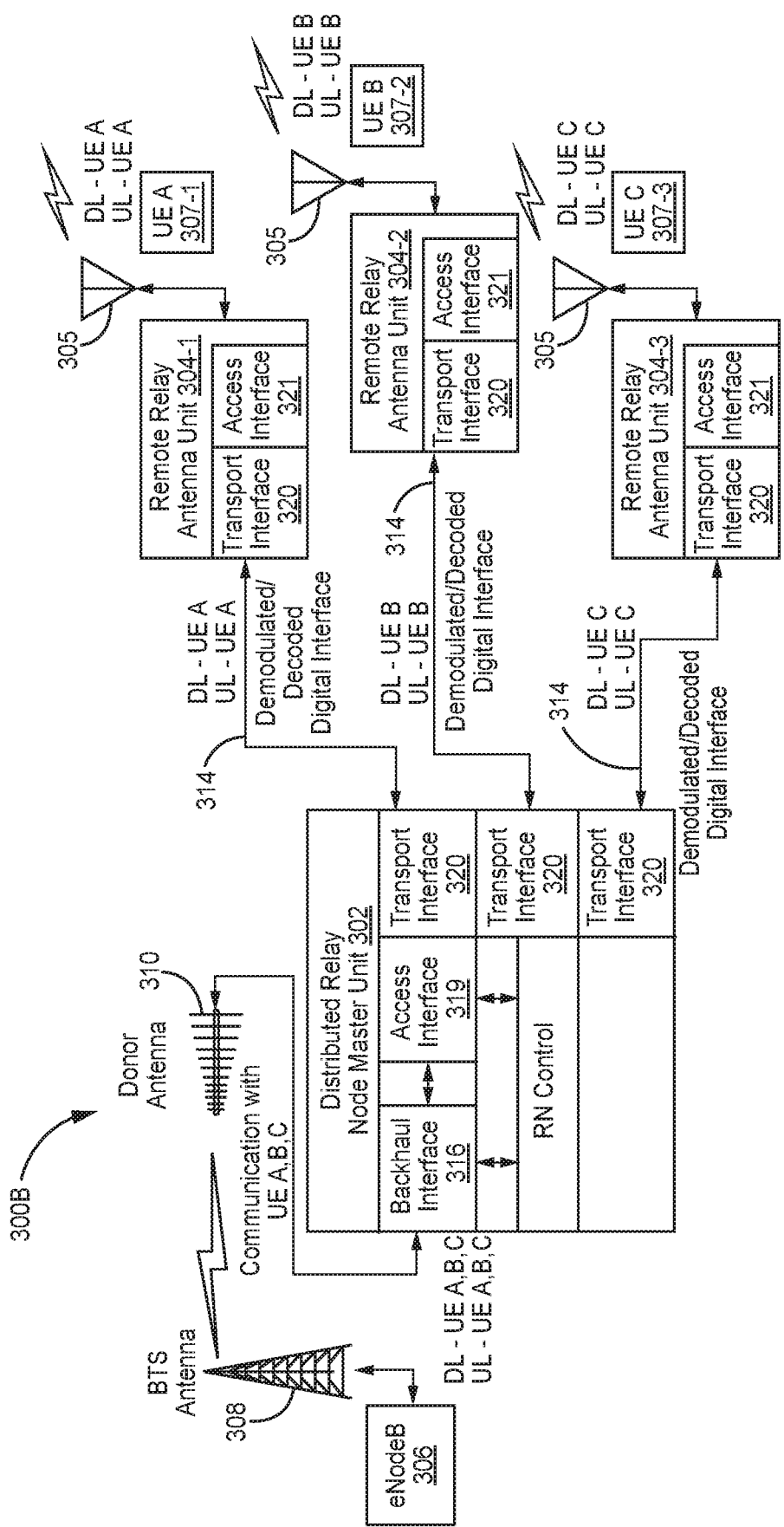

The downlink operation of the distributed relay can occur in multiple ways as shown in FIGS. 3A-3B. In the examples shown in FIGS. 3A-3B, the distributed relay services UEs 307-1, 307-2, and 307-3, where one of remote relay antenna unit 304-1, remote relay antenna unit 304-2, and remote relay antenna unit 304-3 services a respective one of UE 307-1, UE 307-2, and UE 307-3. By demodulating, decoding, and otherwise processing the downlink signals and the uplink signals, the distributed relay node 300A (for example, the scheduler/control circuit(s)) can determine which downlink signals are destined for particular UEs 307, where particular UEs 307 are located, which coverage area particular UEs 307 are positioned within, and which associated remote relay antenna unit is providing coverage to each of the UEs 307. Further, since the scheduler/control circuit(s) are aware of the UEs that are scheduled to transmit in the uplink for a particular Transmission Time Interval (TTI), the distributed relay 300A, 300B has knowledge of the resource blocks to expect during particular TTIs. This specific knowledge enables better localization of the UEs 307 and provides greater flexibility for downlink and uplink operation for the distributed relay.

In the example shown in FIG. 3A, downlink resource blocks for each UE 307 are wirelessly simulcast from more than one of the remote relay antenna units 304 (also referred to here as a "simulast group"). In this example, the corresponding downlink data for each UE 307 is sent by the relay node master unit 302 to all of the remote relay antenna units 304 in the simulcast group of that UE 307. The distributed relay node 300A can select the remote relay antenna units 304 to include in the simulcast groups for downlink transmission in a variety of ways. In some examples, the remote relay antenna units 304 are divided into fixed simulcast groups and downlink data is provided to all remote relay antenna units 304 in the fixed simulcast group if a UE 307 is to be serviced by any of the remote relay antenna units 304 in the fixed simulcast group. In other examples, the simulcast groups can be dynamically assigned based on measurements of a signal reception metric made at the remote relay antenna units 304. For example, each remote relay antenna unit 304 can be configured to measure the Physical Random-Access Channel (PRACH) or reference symbol transmissions from a UE 307, and the remote relay antenna units 304 for which the measured signal reception metric is above a threshold are included in a simulcast group associated with that UE 307.

In the example shown in FIG. 3B, the distributed relay node 300B can use knowledge of the location of the UEs 307 to minimize the amount of downlink front-haul bandwidth that is used to communicate downlink data over the cables 314 from the relay node master unit 302 to the remote relay antenna units 304. In such examples, this UE location information is used to determine which single remote relay antenna unit 304 should wirelessly transmit (unicast) downlink resource blocks for each UE 307 (for example, by determining which remote relay antenna unit 304 each UE 307 is closest to) and the corresponding downlink data for each UE 307 is communicated from the relay node master unit 302 to that single remote relay antenna unit 104 over the associated one or more cables 314. In this example, remote relay antenna unit 304-1 is closest to UE 307-1 and is used to wirelessly transmit resource blocks for UE 307-1, remote relay antenna unit 304-2 is closest to UE 307-2 and is used to wirelessly transmit resource blocks for UE 307-2, and remote relay antenna unit 304-3 is closest to UE 307-3 and is used to wirelessly transmits resource blocks for UE 307-3. Therefore, the downlink data for UE 307-1 is only sent to remote relay antenna unit 304-1, the downlink data for UE 307-2 is only sent to remote relay antenna unit 304-2, and the downlink data for UE 307-3 is only sent to remote relay antenna unit 304-3.

In some examples where, in the uplink direction, the access interface 321 in the remote relay antenna units 304 both demodulates and decodes the uplink baseband data for the received uplink signals transmitted from the UEs 307, only demodulated and decoded data for successfully demodulated and decoded resource blocks are sent to the relay node master unit 302 for further processing by the access interface 319 and the backhaul interface 316 (for example, in order to generate the uplink data that transmitted to the donor base station 306 over the wireless backhaul interface). In some such examples, the remote relay antenna unit 304 can use the cyclic redundancy check to determine if the data for a particular resource block was successfully demodulated and decoded. If the data for a particular resource block was not successfully demodulated or decoded, then the resulting demodulated and decoded data is not sent from the remote relay antenna unit 304 to the relay node master unit 302.

In some such examples, each remote relay antenna unit 304 will attempt to demodulate and decode uplink baseband data for resource blocks for all UEs 307. Resource blocks that are not received at a particular remote relay antenna unit 304 with a sufficient signal-to-noise ratio will not be able to be successfully demodulated and decoded by that remote relay antenna unit 304. Therefore, only resource blocks transmitted from a UE 307 positioned within a threshold distance from the remote relay antenna unit 304 will be able to be successfully demodulated and decoded. By providing data that is successfully demodulated and decoded by the remote relay antenna units 304 and not providing unsuccessfully demodulated and decoded data, the noise level and bandwidth of the uplink communications is reduced.

In other examples, one or more remote relay antenna units 304 will restrict the resource block that it attempts to demodulate and decode to only those resource blocks transmitted from UEs 307 within a threshold distance of each such remote relay anenna unit 304. This restriction can be adaptable based on the location of the UEs 307 and other information discussed above with respect to the downlink operation for FIGS. 3A-3B. For example, remote relay antenna unit 304-1 can restrict its attempted demodulation and decoding to the particular resource blocks from UE 307-1, which is being serviced by remote relay antenna unit 304-1, and mute or otherwise ignore resouce blocks transmitted from by the other UEs 307.

In some situations, a signal from a UE 307 can be received, demodulated, and successfully decoded by two (or more) remote relay antenna units. For example, a UE 307 may be positioned approximately equidistant between two or more remote relay antenna units 304. The distributed scheduler/control circuit 222, 224 will ensure that duplicate information is consolidated before transmitting it to the base station 306. In some examples, the scheduler/control circuit in the relay node master unit 302 is configured to detect that duplicate information has been provided by two or more remote relay antenna units 304 and discard the duplicate information. In other examples, the relay node master unit 302 is configured to jointly process or combine information from a UE 307 received and decoded by multiple remote antenna units 304 to improve performance.

The distributed relays described above can serve multiple radio frequency channels within a frequency band and/or multiple frequency bands. A multiple channel and/or multiple band distributed relay can communicate with multiple base stations, and the remote relay antenna units could communicate with multiple distributed relay node master units.

The distribution of the functionality implemented by the backhaul interface 116 and the access interface 118 can differ for the various bands or channels. In other words, some uplink channels can be demodulated and decoded entirely at the remote relay antenna units while other uplink channels can be demodulated at the remote relay antenna units but decoded at the relay node master unit.

The relay node master unit and the remote relay antenna units of the distributed relay node can be configured to communicate using switched Ethernet links between the relay node master unit and the remote relay antenna units. The distributed relay node is configured to satisfy the time constraints of communication regardless of the type of communication links. By decoding/reencoding, the backhaul interface takes care of the timing between the base station and the relay node master unit, and the access interface takes care of the low-level timing (for example, microsecond level). There is more flexibility in the timing given the lower data rates and reduced bandwidth required to transport the information, so the synchronous links typically required for previous distributed antenna systems are not required for the distributed relay.

The distributed relay nodes described above are configured to provide similar multiple antenna coverage of a distributed antenna system without requiring the use of a distributed antenna system coupled to a L1/L2/L3 relay. These designs provide significant benefits for in-building or other applications with a large amount of obstructions for radio frequency signals. By using the distributed relay nodes described above, there is no longer need for a separate distributed antenna system coupled to the relay, which can reduce equipment costs.

Further, the distributed relay nodes are able to communicate using a lower bit rate than typical distributed antenna systems, which enables the use of lower bandwidth and lower cost communication channels between the relay node master unit and the remote relay antenna units. Also, compared to a L1/L2/L3 relay, with or without being combined with a typical distributed antenna system, the distributed relay node also provides better signal quality by only providing uplink signals that are successfully demodulated and decoded.

Integrated Relay Distributed Antenna System

Figure 4A:
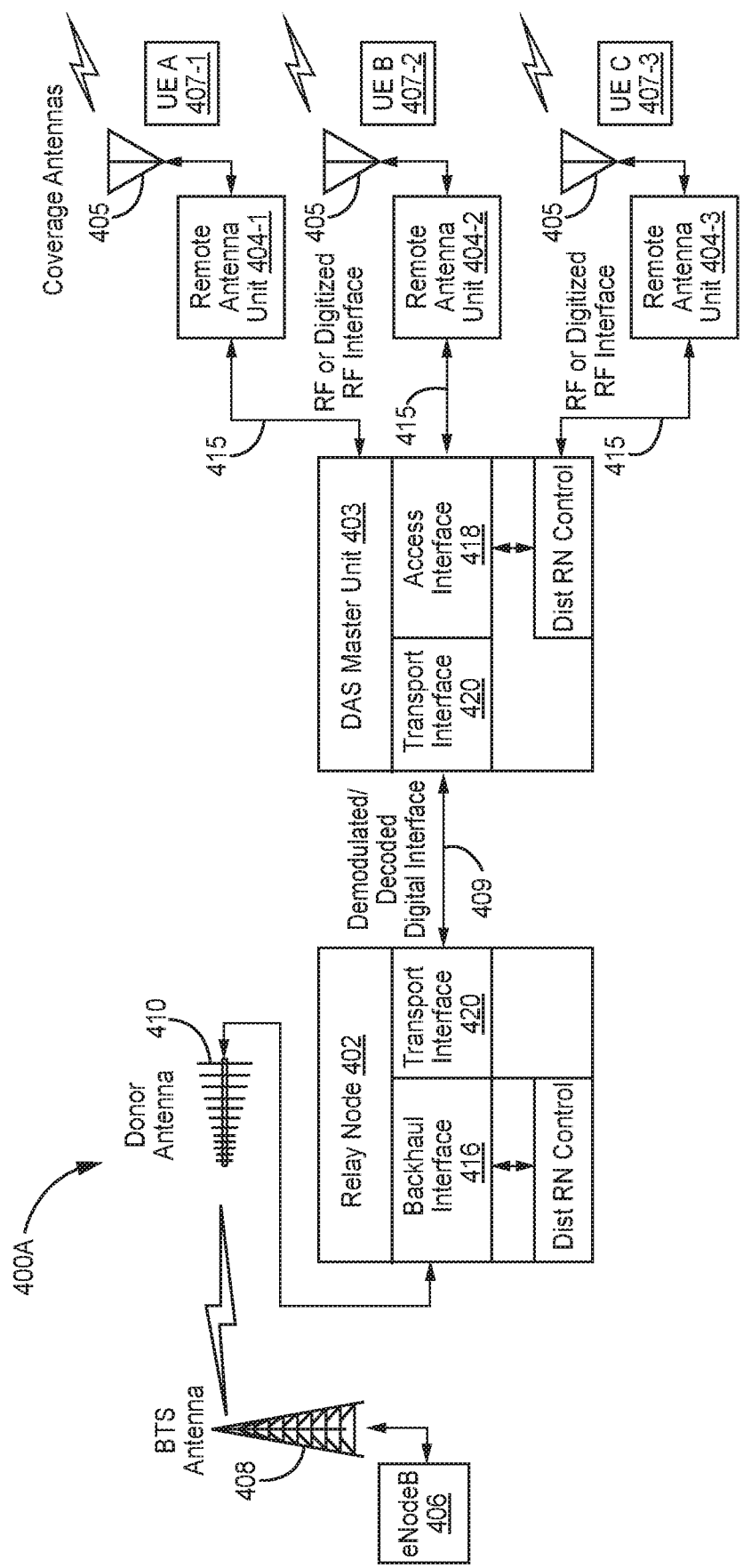
FIGS. 4A-4B are block diagrams of example integrated relay distributed antenna systems.
Figure 4B:
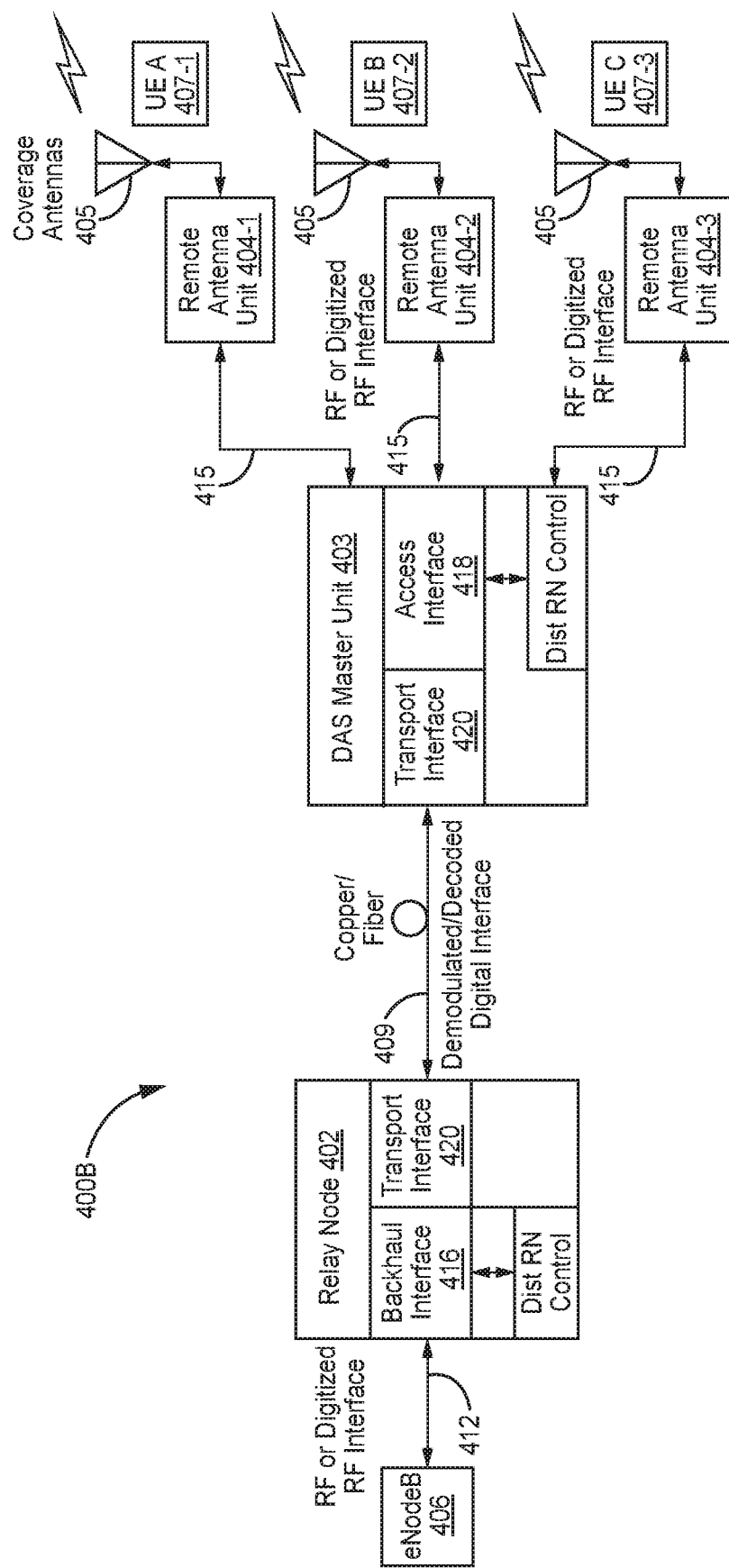

FIGS. 4A-4B are block diagrams illustrating examples of an integrated relay distributed antenna system 400A, 400B. In the examples shown in FIGS. 4A-4B, the integrated relay distributed antenna system 400A, 400B includes a relay node 402, a master unit 403, and three remote antenna units 404. It should be understood that different numbers of relay nodes 402, master units 403, or remote antenna units 404 can be used depending on the desired performance of the system. The integrated relay distributed antenna system 400A, 400B can be deployed at a site to provide wireless coverage and capacity for one or more wireless network operators. The site may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

The relay node 402 is communicatively coupled to one or more base stations 406 (for example, one or more eNode-Bs). In some examples, such as the example shown in FIG. 4A, the relay node 402 is wirelessly coupled to the base station 406 via one or more donor antennas 410. In such examples, the donor antenna 410 can be positioned on the roof of a building or other location to improve reception of the signals from the antenna 408 of the base station 406.

In some examples, such as the example shown in FIG. 4B, the relay node 402 is directly connected to the base station 406. The relay node 402 can be directly connected to the base station 406 (or to a portion thereof such as a baseband unit) using copper cabling or optical fiber, for example. A direct connection 412 between the relay node 402 and the base station 406 can be beneficial in installations where there is not a radio frequency path between the base station 406 and relay node 402, such as, for example, on a university or corporate campus where a large amount of base stations are located in a base station hotel.

The relay node 402 is also communicatively coupled to a master unit 403 of a distributed antenna system. In some examples, the relay node 402 is co-located with the master unit 403. In other examples, such as the example shown in FIG. 4B, the relay node 402 is located remotely from the master unit 403. For example, the relay node 402 can be located many kilometers from the master unit 403 and communicate with the master unit 403 over one or more cables 409 implementing a digital interface. In some examples, the cables 409 can include one or more optical or copper cables that comply with the Category 5, Category 5e, Category 6, Category 6A, or Category 7 specifications. Future communication medium specifications used for Ethernet signals or other protocols are also within the scope of the present disclosure.

The master unit 403 of the distributed antenna system is communicatively coupled to one or more remote antenna units 404, which are located remotely from master unit 403. In some examples, the master unit 403 is communicatively coupled to the remote antenna units 404 via one or more cables 415. In some examples, the cables 415 can include one or more optical or copper cables that comply with the Category 5, Category 5e, Category 6, Category 6A, or Category 7 specifications. Future communication medium specifications used for Ethernet signals or other protocols are also within the scope of the present disclosure. Each remote antenna unit 404 is coupled to or includes one or more antennas 405.

The base station 406 will be aware that signals are being communicated to UEs 407 via a relay node, but the base station 406 will most likely not be aware of the distributed antenna system. In some examples, the integrated relay distributed antenna system 400A, 400B is configured to operate similarly to an in-band relay where radio frequency signals are communicated over the access interface between the remote antenna units 404 of the integrated relay distributed antenna system 400A, 400B and UEs 407 served by the integrated relay distributed antenna system 400A, 400B using the same carrier frequency that the base station 406 uses to communicate radio frequency signals over the backhaul interface between the base station 406 and the relay node 402. In such examples, the integrated relay distributed antenna system 400A, 400B is configured with sufficient isolation between the donor antenna 410 and the coverage antennas 405 and/or, in the case where the integrated relay distributed antenna system 400A, 400B operates as Type 2 relay, the operation of the in-band integrated relay distributed antenna system 400A, 400B is controlled such that different resource blocks are used for communicating over the backhaul interface between the donor base station 406 and the integrated relay distributed antenna system 400A, 400B and for communicating over the access interface established between the integrated relay distributed antenna system 400A, 400B and the UEs 407 served by the integrated relay distributed antenna system 400A, 400B.

In other examples, the integrated relay distributed antenna system 400A, 400B is configured to operate similarly to an out-of-band relay where radio frequency signals are communicated over the access interface established between the remote antenna units 404 of the integrated relay distributed antenna units 404 and the UEs 407 using a different carrier frequency than is used by the base station 406 to communicate radio frequency signals over the backhaul interface established between the base station 406 and the relay node 402. In such examples, the base station 406 is aware that signals are being communicated to UEs 407 via a relay that communicates using a different frequency band.

In contrast to the typical implementation that includes a single-point repeater or L2/L3 relay in combination with a DAS, the integrated relay distributed antenna systems described herein decompose the relay node circuitry and integrate it with various components of the distributed antenna system. Similar to the distributed relays discussed above, the examples of an integrated relay distributed antenna system 400A, 400B shown in FIGS. 4A-4B include backhaul interface circuitry 416 (also referred to here simply as the "backhaul interface 416") and access interface circuitry 418 (also referred to here simply as the "access interface 418"). The backhaul interface circuitry 416 implements the wireless backhaul interface established between the base station 406 and the integrated relay distributed antenna system 400A, 400B and the access interface circuitry 418 implements the wireless access interface established between the integrated relay distributed antenna system 400A, 400B and the UEs 407 served by the integrated relay distributed antenna system 400A, 400B. In some examples, the wireless backhaul interface comprises the LTE-Un interface, and the wireless access interface comprises the LTE-Uu interface.

In addition to the "external" interfaces (the backhaul interface 416 and the access interfaces 418) used for wirelessly communicating with entities deployed outside the integrated relay distributed antenna system 400A, 400B, the integrated relay distributed antenna system 400A, 400B includes transport interfaces 420 to enable communication between the relay node 402 and the master unit 403 over the cables 409 and to accommodate the split of functionality among the relay node 402 and the master unit 403. In an example where the relay node 402 is coupled to the master unit 403 using one or more fiber cables, the respective transport interfaces 420 in the relay node 402 and in the master unit 403 are configured for communicating over the fiber cables using appropriate communication protocols (for example, one or more Gigabit Ethernet protocols). In an example where the relay node 402 is coupled to the master unit 104 using one or more copper cables, the respective transport interfaces 420 in the relay node 402 and in the master unit 403 are configured for communicating over the copper cables using appropriate communication protocols (for example, one or more Gigabit Ethernet protocols).

A scheduler/control circuit is configured to process, schedule, and forward data received via one of the interfaces 416 or 418 to the other one of the other interfaces 416 or 418 as necessary to implement the associated type of integrated relay distributed antenna system. In some examples, the division of components included in the backhaul interface 416 and access interface 418 for the integrated relay distributed antenna system 400A, 400B may vary between implementations.

In the examples shown in FIGS. 4A-4B, components of the access interface circuitry are integrated with only the master unit 403 of the integrated relay distributed antenna system 400A, 400B. In such examples, the backhaul interface circuitry 416 is retained in the relay node 402 and separated from the access interface circuitry 418, which is integrated into the master unit 403 of the integrated relay distributed antenna system 400A, 400B. The backhaul interface circuitry 416 to implement the wireless backhaul interface of the integrated relay distributed antenna system shown in FIGS. 4A-4B includes similar components as the backhaul interface circuitry 116 shown in FIG. 2 and the backhaul interface circuitry 416 is integrated into the relay node 402. In some examples, in the downlink path, the backhaul interface circuitry 416 (for example, a receiver radio processing circuit) of the relay node 402 is configured to receive downlink signals from the base station, down convert and digitize the downlink radio frequency signals received via the donor antennas 410. In some examples, the backhaul interface circuitry 416 (for example, a receiver baseband processing circuit) of the relay node 402 is further configured to demodulate, decode, and otherwise process the resulting downlink baseband data in order to recover the control-plane and user-plane data communicated from the donor base station 406 to the integrated relay distributed antenna system 400A, 400B over the wireless backhaul interface. The recovered downlink control-plane and user-plane data is provided to the access interface circuitry 418.

In some examples, in the uplink path, the backhaul interface circuitry 416 (for example, a transmitter baseband processing circuit) of the relay node 402 receives uplink control-plane and user-plane data output by the access interface 418 and is configured to perform the encoding, modulation, and other baseband processing necessary to produce baseband data from the control-plane and user-plane data that is scheduled to be transmitted by the integrated relay distributed antenna system 400A, 400B to the donor base station 406 over the backhaul interface. In some examples, the backhaul interface circuitry 416 (for example, a transmitter radio processing circuit) of the relay node 402 is further configured to digital-to-analog convert and upconvert the resulting baseband data in order to produce uplink analog RF signals suitable for communication over the wireless backhaul interface. In some examples, the backhaul interface 416 (for example, a power amplifier) of the relay node 402 is further configured to amplify the uplink analog RF signals and the resulting amplified uplink analog RF signals are coupled to the donor antennas 410 via a duplexer for wireless communication to the donor base station 406.

In some examples, in the downlink path, the access interface 418 (for example, a transmitter baseband processing circuit) of the master unit 403 receives downlink control-plane and user-plane data output by the backhaul interface 416 and is configured to encode, modulate, and otherwise process the control-plane and/or user-plane data that is scheduled to be communicated to each served UE 407 over the wireless access interface. In some examples, the access interface 418 (for example, a transmitter radio processing circuit) in the master unit 403 of the DAS is further configured to digital-to-analog convert and upconvert the resulting baseband data in order to produce downlink analog RF signals suitable for communication over the wireless access interface. The master unit 403 and the remote antenna units 404 of the DAS can be configured to communicate using an analog radio frequency interface or a digitized radio frequency interface. In examples where an analog radio frequency interface is used, the master unit 403 is configured to amplify and provide the downlink radio frequency signals to the remote antenna units 404 in analog form. In examples where a digitized radio frequency interface is used, the master unit 403 is configured to generate a downlink transport signal from the downlink analog radio frequency signals, which is distributed to the remote antenna units 404. In the examples shown in FIGS. 4A-4B, each remote antenna unit 404 receives the downlink transport signals provided by the master unit 403 and reconstructs a version of the downlink RF signals for the UEs 407 based on the signals provided by the master unit 403. Each remote antenna unit 404 then causes the downlink RF signals to be radiated from at least one antenna 405 coupled to or included in that remote antenna unit 404.

In the uplink, RF signals transmitted from UEs 407 (also referred to herein as "uplink RF signals") are received at one or more remote antenna units 404. Each remote antenna unit 404 uses the uplink RF signals to generate uplink signals, in either analog or digital form, that are transmitted to the master unit 403. The master unit 403 receives the uplink signals transmitted from remote antenna units 404 coupled to it and combines the uplink signals received at the master unit 403.

In the examples shown in FIGS. 4A-4B, the access interface circuitry 418 (for example, a receiver radio processing circuit) of the master unit 403 is configured to down convert and digitize the combined uplink signals received from the remote antenna units 404. In some examples, the access interface circuitry 418 (for examples, a receiver baseband processing circuit) of the master unit 403 is further configured to demodulate, decode, and otherwise process the resulting uplink baseband data in order to recover the control-plane and user-plane data communicated from each UE 407 to the integrated relay distributed antenna system 400A, 400B over the access interface. The recovered uplink control-plane and user-plane data is provided to the backhaul interface circuitry 416.

As noted above, in the examples shown in FIGS. 4A-4B, the backhaul interface circuitry 416 is implemented entirely in the relay node 402. That is, the backhaul interface circuitry 416 in the relay node 402 both demodulates and decodes the corresponding downlink baseband data generated for the downlink signals received via the wireless backhaul interface and both encodes and modulates the corresponding uplink baseband data generated for the uplink signals to be transmitted via the wireless backhaul interface. As a result, the data communicated in the downlink direction over the transport cables 409 between the relay node 402 and the master unit 403 is produced after the corresponding downlink baseband data generated for the downlink signals received via the wireless backhaul interface has been both demodulated and decoded and is referred to here as "demodulated and decoded" data.

Also, as noted, in the examples shown in FIGS. 4A-4B, the access interface circuitry 418 is implemented entirely in the master unit 403. That is, the access interface circuitry 418 in the master unit 403 both encodes and modulates the corresponding downlink baseband data to be transmitted via the wireless access interface and both demodulates and decodes the corresponding uplink baseband data generated for the uplink signals received via the wireless access interface. As a result, the data communicated in the uplink direction over the transport cables 409 between the master unit 403 and the relay node 402 is produced after the corresponding data received via the wireless access interface has been both demodulated and decoded and is therefore referred to here as "demodulated and decoded" data.

In some examples, the access interface circuitry 418 can be split between the relay node 402 and the master unit 403. In some such examples, the access interface circuitry in the relay node, for at least some of the downlink physical channels, encodes the corresponding downlink baseband data, whereas the access interface circuitry in the master unit 403 performs the modulation for those downlink channels. In such examples, the access interface circuitry in the master unit 403, for at least some of the uplink physical channels, demodulates the corresponding uplink baseband data generated for the uplink signals received via the wireless access interface whereas the access interface circuitry in the relay node 402 performs the decoding for those uplink channels. As a result, in such examples, the data communicated in the uplink direction for those uplink physical channels over the transport cable 409 between the master unit 403 and the relay node 402 is produced after the corresponding data received via the wireless access interface has been demodulated but not yet decoded and is therefore referred to here as "demodulated" data.

In the examples shown in FIGS. 4A-4B, it is important to note that the internal processing and communication of the signals within the DAS is implemented in a traditional manner and does not "demodulate" any of the resource blocks that are repeated internally with the DAS. That is, this internal DAS processing does not extract or recover the encoded data communicated in accordance with a particular modulation scheme and, instead, the modulation used to convey such encoded data is maintained throughout the processing and communication by the DAS.

Figure 5A:
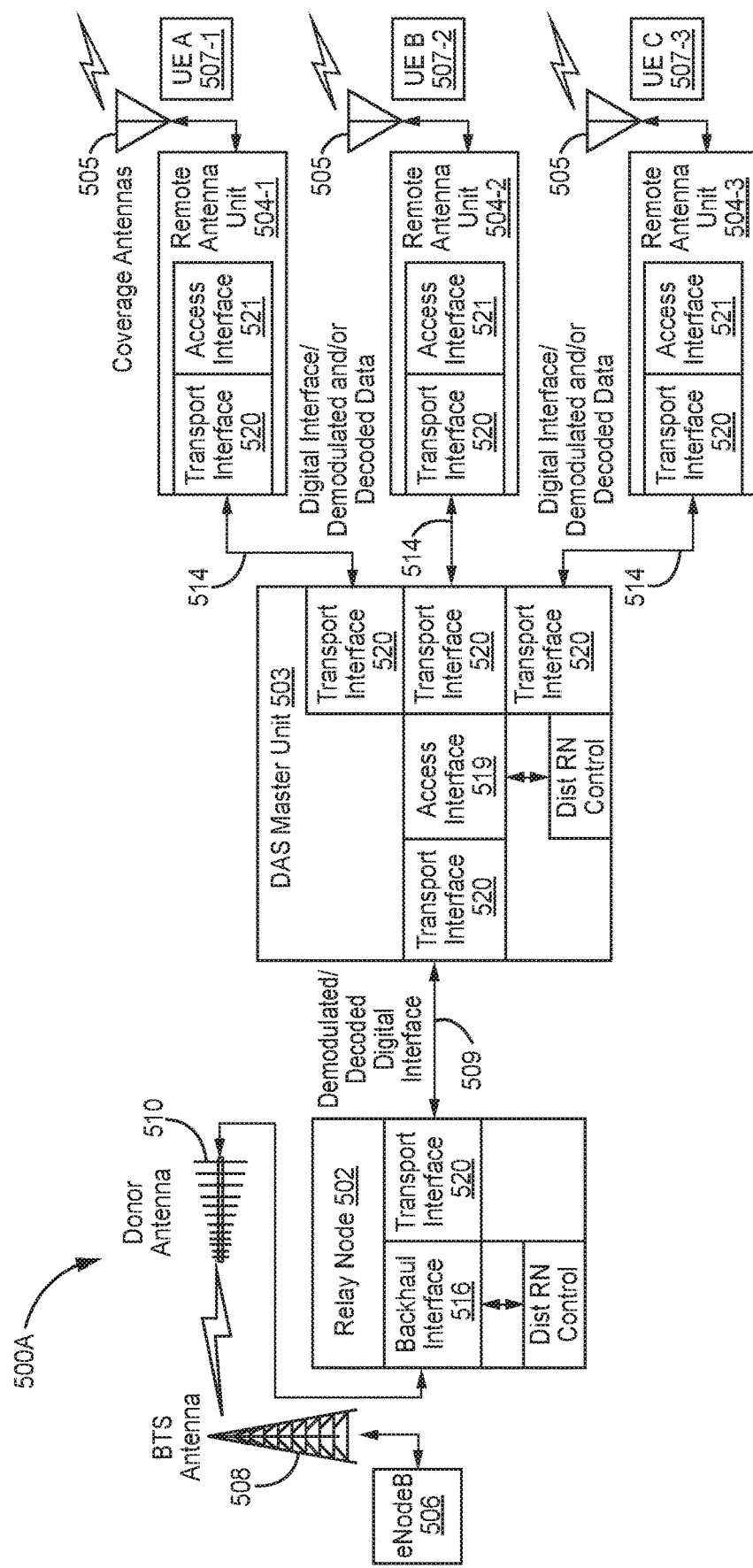
FIGS. 5A-5B are block diagrams of example integrated relay distributed antenna systems.
Figure 5B:
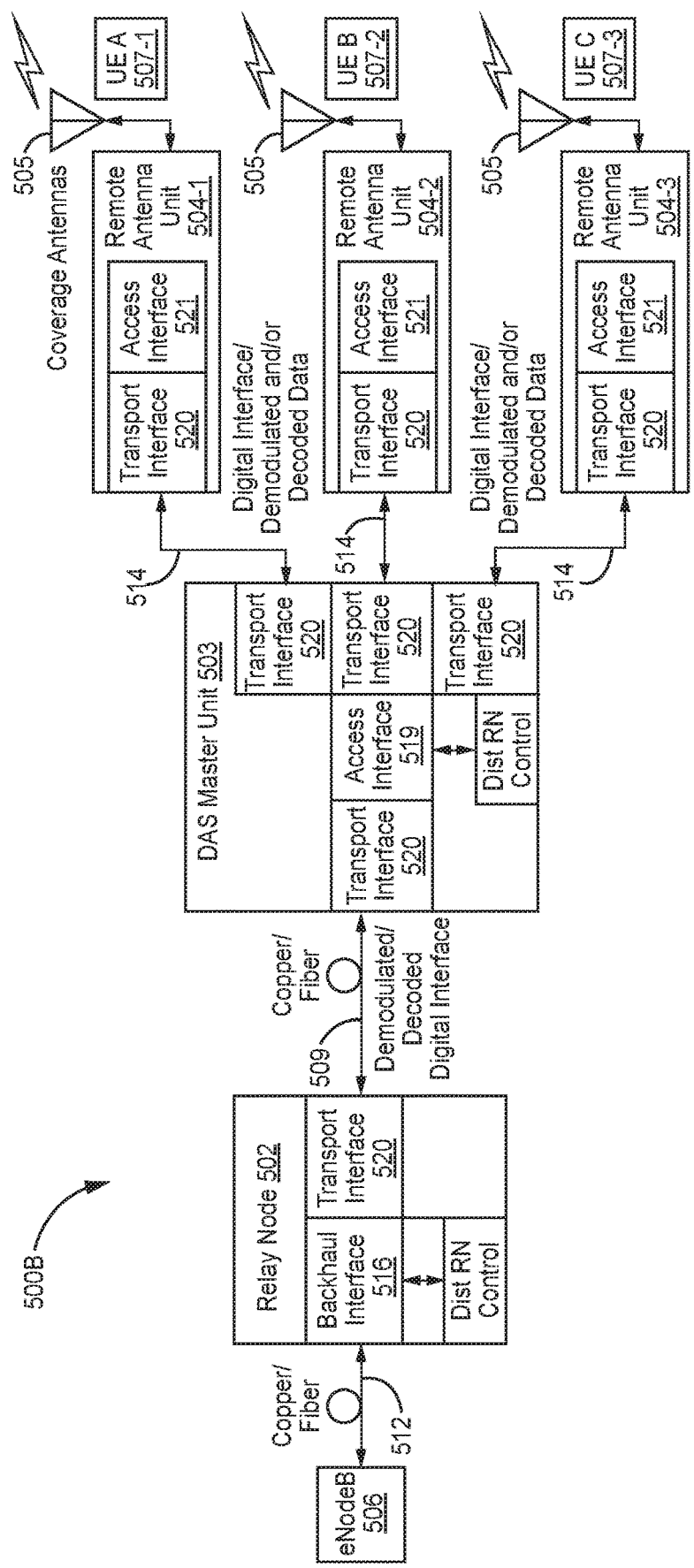

FIGS. 5A-5B are block diagrams of example integrated relay distributed antenna systems 500A, 500B with the access interface 418 being distributed between the master unit 503 and the remote antenna units 504 of the DAS. The key difference compared to the integrated relay distributed antenna systems 400A, 400B in FIGS. 4A-4B is that demodulated and decoded data and/or demodulated data is transported between the master unit 503 and remote antenna units 504 via a digital interface 514 in FIGS. 5A-5B rather than using a radio frequency interface or digitized radio frequency interface 415.

As shown in FIGS. 5A-5B, the access interface 418 of the integrated relay distributed antenna system 400A, 400B is divided and distributed between the master unit 503 and the remote antenna units 504 (access interfaces 519 and 521, respectively). The exact distribution of the components or functionality of access interface 418 between the access interface 519 of the master unit 503 and the access interface 521 of the remote antenna units 504 can vary depending on the implementation. In other examples, the access interface 418 of the integrated relay distributed antenna system 400A, 400B is implemented entirely in the remote antenna units 504. Also, as shown in FIGS. 5A-5B, the backhaul interface circuitry 516 of the integrated relay distributed antenna system 500A, 500B is implemented entirely in the relay node 502. In other examples, the backhaul interface circuitry 516 of the integrated relay distributed antenna system 500A, 500B is divided between the relay node 502 and the master unit 503.

As noted above, in the examples shown in FIGS. 5A-5B, the backhaul interface circuitry 516 is implemented entirely in the relay node 502. That is, the backhaul interface circuitry 516 in the relay node 502 both demodulates and decodes the corresponding downlink baseband data generated for the downlink signals received via the wireless backhaul interface and both encodes and modulates the corresponding uplink baseband data generated for the uplink signals to be transmitted via the wireless backhaul interface. As a result, the data communicated in the downlink direction over the transport cables 509 between the relay node 502 and the master unit 503 is produced after the corresponding downlink baseband data generated for the downlink signals received via the wireless backhaul interface has been both demodulated and decoded and is referred to here as "demodulated and decoded" data.

Also, as noted, in the examples shown in FIGS. 5A-5B, the access interface circuitry 418 is distributed between the master unit 503 and the remote antenna units 504. In one example, the access interface circuitry 519 in the master unit 503, for at least some of the downlink physical channels, encodes the corresponding downlink baseband data, whereas the access interface circuitry 521 in each remote antenna unit 504 performs the modulation for those downlink channels. In such an example, the access interface circuitry 521 in each remote antenna unit 504, for at least some of the uplink physical channels, demodulates the corresponding uplink baseband data generated for the uplink signals received via the wireless access interface whereas the access interface circuitry 519 in the master unit 503 performs the decoding for those uplink channels. As a result, in such an example, the data communicated in the uplink direction for those uplink physical channels over the transport cables 514 between the remote antenna units 504 and the master unit 503 is produced after the corresponding data received via the wireless access interface has been demodulated but not yet decoded and is therefore referred to here as "demodulated" data.

In another example, the access interface circuitry 521 in each remote antenna unit 504, for at least some of the downlink physical channels, both encodes and modulates the corresponding downlink baseband data for those downlink channels. In such an example, the access interface circuitry 521 in each remote antenna unit 504, for at least some of the uplink physical channels, both demodulates and decodes the corresponding uplink baseband data generated for the uplink signals received via the wireless access interface for those uplink channels. As a result, in such an example, the data communicated in the uplink direction for those uplink physical channels over the transport cables 514 between the remote antenna units 504 and the master unit 503 is produced after the corresponding data received via the wireless access interface has been both demodulated and decoded and is therefore referred to here as "demodulated and decoded" data.

Rather than transporting analog radio frequency or digitized radio frequency signals over the cables 514 between the master unit 503 and remote antenna units 504 as in a typical DAS implementation, the integrated relay distributed antenna system 500A, 500B transports data between the master unit 503 and remote antenna units 504 as either "demodulated and decoded" data or "demodulated" data. This enables the use of lower speed interfaces for the integrated relay distributed antenna system compared to a digitized radio frequency interface as shown in FIGS. 4A-4B. It is noted that transporting "demodulated and decoded" data provides the greatest benefit in this regard, but transporting "demodulated" data enables the use of lower data rates compared to the analog radio frequency or digitized radio frequency interfaces of a distributed antenna system. as shown in FIGS. 4A-4B. However, it is to a lesser extent compared to communicating "demodulated and decoded" data between the master unit 503 and the remote antenna units 504. Moreover, the "demodulation" referred to here in connection with the phrases "demodulated" data and "demodulated and decoded" data is not simply generating analog or digital in-phase (I) and quadrature (Q) signals or data but instead refers to the extraction or recovery of the encoded data communicated in accordance with a particular modulation scheme (for example, quadrature phase-shift keying (QPSK), 16-phase quadrature amplitude modulation (16QAM), or 64-state quadrature amplitude modulation (64QAM)).

The scheduler/control circuit of the integrated relay distributed antenna system 500A, 500B is also distributed between the relay node 502, the master unit 503, and the remote antenna units 504 in the examples shown in FIGS. 5A-5B. In some examples, the scheduler/control circuit of the backhaul interface 516 and/or access interface 519 of the master unit 503 can be configured to control routing of downlink data to the remote antenna units 504 and to modify some of the control information in the downlink data. Similarly, in some examples, the scheduler/control circuit of the access interface 521 of the remote antenna units 504 can be configured to modify the routing of uplink data to the master unit 503 and modify some of the control information in the uplink data. Further modification of the control information of downlink data and the uplink data can also be performed by the access interfaces 521, 519 at the remote antenna unit 504 and master unit 503, if desired. In some examples, the scheduler/control circuit of the backhaul interface 516 is integrated with the receiver baseband processing circuit and/or the transmitter baseband processing circuit of the relay node 502. Similarly, in some examples, the scheduler/control circuit of the access interface can be integrated with the receiver baseband processing circuit and/or the transmitter baseband processing circuit of the master unit or remote antenna units of the DAS.

The downlink operation of the integrated relay distributed antenna system can occur in multiple ways and in a similar manner to that discussed above with respect to the distributed relay and in FIGS. 3A-3B. In the examples shown in FIGS. 5A-5B, the integrated relay distributed antenna system 500A, 500B services UEs 507-1, 507-2, 507-3, where one of remote antenna unit 504-1, remote antenna unit 504-2, and remote antenna unit 504-3 services a respective one of UE 507-1, UE 507-2, and UE 507-3. By demodulating, decoding, and otherwise processing the downlink signals and the uplink signals, the integrated relay distributed antenna system 500A, 500B (for example, the scheduler/control circuit(s)) can determine which downlink signals are destined for particular UEs 507, where particular UEs 507 are located, which coverage area particular UEs 507 are positioned within, and which associated remote relay antenna unit is providing coverage to each of the UEs 507. Further, since the scheduler/control circuit(s) are aware of the UEs that are scheduled to transmit in the uplink for a particular TTI, the integrated relay distributed antenna system 500A, 500B has knowledge of the resource blocks to expect during particular TTIs. This specific knowledge enables better localization of the UEs 507 and provides greater flexibility for downlink and uplink operation for the integrated relay distributed antenna system.

In some examples, downlink resource blocks for each UE 507 are wirelessly simulcast from more than one of the remote antenna units 504 (also referred to here as a "simulast group"). In such examples, the corresponding downlink data for each UE 507 is sent by the master unit 503 to all of the remote antenna units 504 in the simulcast group of that UE 507. The integrated relay distributed antenna system 500A, 500B can select the remote antenna units 504 to include in the simulcast groups for downlink transmission in a variety of ways. In some examples, the remote antenna units 504 are divided into fixed simulcast groups and downlink data is provided to all remote antenna units 504 in the fixed simulcast group if a UE 507 is to be serviced by any of the remote antenna units 504 in the fixed simulcast group. In other examples, the simulcast groups can be dynamically assigned based on measurements of a signal reception metric made at the remote antenna units 504. For example, each remote antenna unit 504 can be configured to measure the Physical Random-Access Channel (PRACH) or reference symbol transmissions from a UE 507, and the remote antenna units 504 for which the measured signal reception metric is above a threshold are included in a simulcast group associated with that UE 507.

In other examples, the integrated relay distributed antenna system 500A, 500B can use knowledge of the location of the UEs 507 to minimize the amount of downlink front-haul bandwidth that is used to communicate downlink data over the cables 514 from the master unit 503 to the remote antenna units 504. In such examples, this UE location information is used to determine which single remote antenna unit 504 should wirelessly transmit (unicast) downlink resource blocks for each UE 507 (for example, by determining which remote antenna unit 504 each UE 507 is closest to) and the corresponding downlink data for each UE 507 is communicated from the master unit 503 to that single remote antenna unit 504 over the associated one or more cables 514. In this example, remote antenna unit 504-1 is closest to UE 507-1 and is used to wirelessly transmit resource blocks for UE 507-1, remote antenna unit 504-2 is closest to UE 507-2 and is used to wirelessly transmit resource blocks for UE 507-2, and remote antenna unit 504-3 is closest to UE 507-3 and is used to wirelessly transmits resource blocks for UE 507-3. Therefore, the downlink data for UE 507-1 is only sent to remote antenna unit 504-1, the downlink data for UE 507-2 is only sent to remote antenna unit 504-2, and the downlink data for UE 507-3 is only sent to remote antenna unit 504-3.

In some examples where, in the uplink direction, the access interface 521 in the remote antenna units 504 both demodulates and decodes the uplink baseband data for the received uplink signals transmitted from the UEs 507, only successfully demodulated and decoded resource blocks are sent to the master unit 503 and relay node 502 for further processing by the access interface 519 and the backhaul interface 516 (for example, in order to generate the uplink data that transmitted to the donor base station 506 over the wireless backhaul interface). In some such examples, the remote antenna units 504 can use the cyclic redundancy check to determine if the data for a particular resource block was successfully demodulated and decoded. If the data for a particular resource block was not successfully demodulated and decoded, then the resulting demodulated and decoded data is not sent from the remote antenna unit 504 to the master unit 503.

In some such examples, each remote antenna unit 504 will attempt to demodulate and decode uplink baseband data for resource blocks for all UEs 507. Resource blocks that are not received at a particular remote antenna unit 504 with a sufficient signal-to-noise ratio will not be able to be successfully demodulated and decoded by that remote antenna unit 504. Therefore, only resource blocks transmitted from a UE 507 positioned within a threshold distance from the remote antenna unit 504 will be able to be successfully demodulated and decoded. By providing data that is successfully demodulated and decoded by the remote antenna units 504 and not providing unsuccessfully demodulated and decoded data, the noise level and bandwidth of the uplink communications is reduced.

In other examples, one or more remote antenna units 504 will restrict the resource blocks that it attempts to demodulate and decode to only those resource blocks transmitted from UEs 507 within a threshold distance of each such remote antenna unit 504. This restriction can be adaptable based on the location of the UEs 507 and other information discussed above. For example, remote antenna unit 504-1 can restrict its attempted demodulation and decoding to the particular resource blocks from UE 507-1, which is being serviced by remote antenna unit 504-1, and mute or otherwise ignore resource blocks transmitted by other UEs 507.

In some situations, a signal from a UE 507 can be received, demodulated, and successfully decoded by two (or more) remote antenna units 504. For example, a UE 507 may be positioned approximately equidistant between two or more remote antenna units 504. The distributed scheduler/control circuit will ensure that duplicate information is consolidated before transmitting it to the base station 506. In some examples, the scheduler/control circuit in the master unit 503 is configured to detect that duplicate information has been provided by two or more remote antenna units 504 and discard the duplicate information. In other examples, the master unit 503 is configured to jointly process or combine information from a UE 507 received and decoded by multiple remote antenna units 504 to improve performance.

Figure 6:
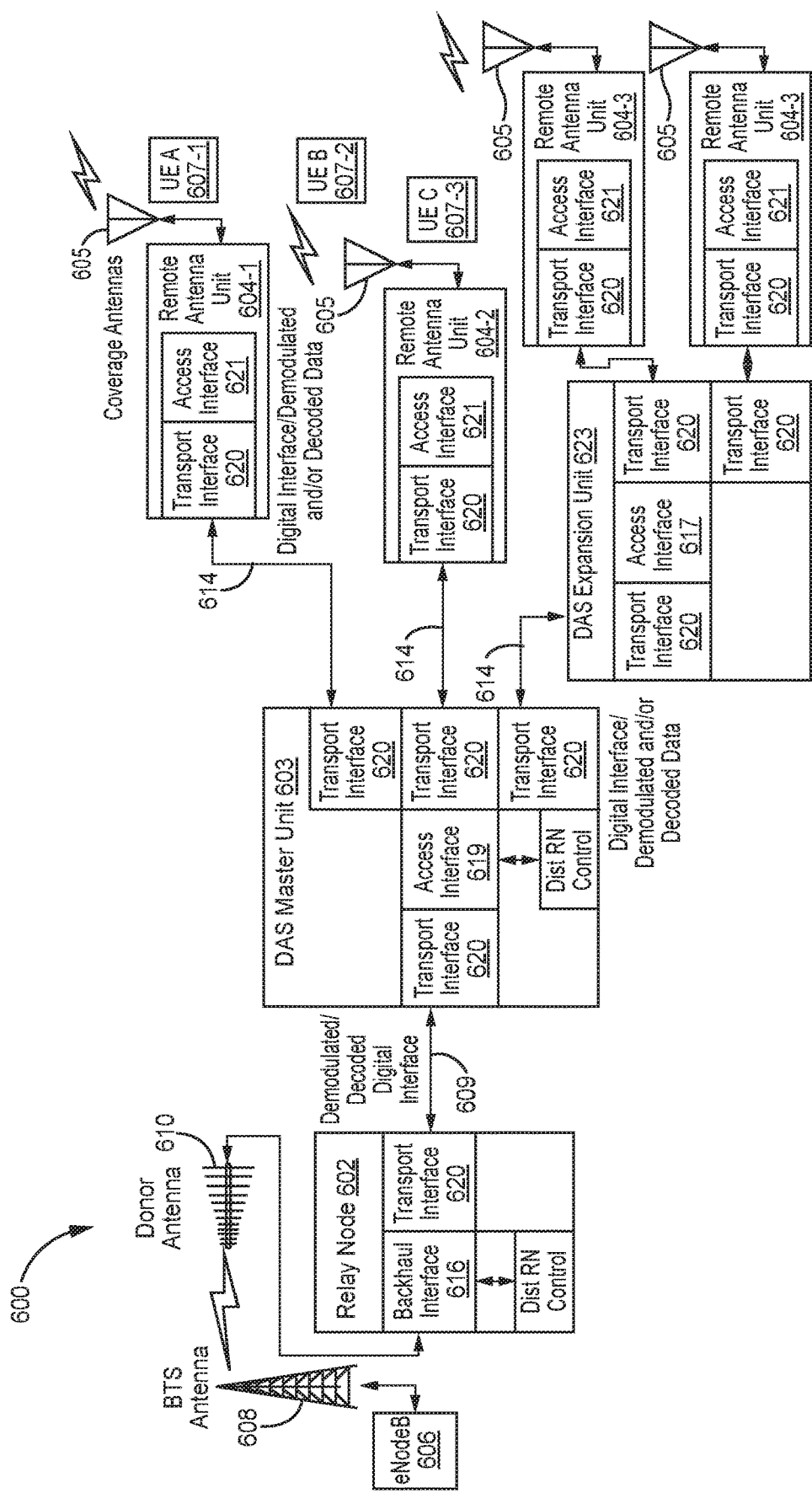
FIG. 6 is a block diagram of an example integrated relay distributed antenna system.

In the example shown in FIG. 6, the integrated relay distributed antenna system 600 includes an expansion unit 623 between the master unit 603 and remote antenna units 604-3, 604-4 to expand the number of remote antenna units 604 supported by the integrated relay distributed antenna system 600. The functions, structures, and other description of common elements of the integrated relay distributed antenna 500A, 500B discussed above with respect to FIGS. 5A-5B are also applicable to like named features in integrated relay distributed antenna system 600 shown in FIG. 6. Further, like named features included in FIGS. 5A-5B and FIG. 6 are numbered similarly.

In the example shown in FIG. 6, the access interface is further distributed between the master unit 603, the expansion unit 623, and the remote antenna units 604 (access interfaces 619, 617, and 621, respectively). In some examples, the expansion unit 623 can include the scheduler/control circuit that is configured to detect that duplicate information has been provided by two or more remote antenna units 604 and discard the duplicate information. In other examples, the expansion unit 623 is configured to jointly process or combine information from a UE 607 received and decoded by multiple remote antenna units 604 to improve performance. Similar to the transport interfaces described above with respect to FIGS. 5A-5B, the expansion unit 623 can be configured to communicate "demodulated and decoded" data and/or "demodulated" data with the master unit 602 and the remote antenna units 604-3, 604-4 via the transport interfaces 620.

The architecture in FIGS. 5A-6 has the further advantage that uplink noise is reduced compared to the architecture in FIGS. 4A-4B. If radio frequency or digitized radio frequency signals are sent from the remote antenna units to the master unit, then all the uplink signals need to be summed together before attempting to demodulate and decode the signals, meaning all the noise received by all the antennas is summed together which increases the noise floor. Often, signals from a UE are received by only one remote antenna unit, so noise from other remote antenna units degrades performance. By including the demodulation and decoding functionality in the remote antenna units, then only data from remote antenna units capable of being successfully demodulated and decoded from a UE are included in the signal to the relay backhaul interface.

The integrated relay distributed antenna systems described above can serve multiple radio frequency channels within a frequency band and/or multiple frequency bands. A multiple channel and/or multiple band integrated relay distributed antenna system can communicate with multiple base stations, and the distributed antenna system could communicate with multiple relay nodes.

The distribution of the functionality implemented by the backhaul interface 416 and the access interface 418 can differ for the various bands or channels. In other words, some uplink channels can be demodulated and decoded entirely at the remote antenna units while other uplink channels can be demodulated at the remote antenna units but decoded at the master unit or the expansion unit.

In some examples, the master unit of the integrated relay distributed antenna system can be directly coupled to one or more additional base stations (not shown). The one or more additional base stations can be co-located with the respective master unit to which it is coupled (for example, where the base station is dedicated to providing base station capacity to the DAS). In some examples, these additional base stations can be implemented as a traditional monolithic base station. In other examples, the additional base stations can be implemented using a distributed base station architecture in which a base band unit (BBU) is coupled to one or more remote radio heads (RRHs), where the front haul between the BBU and the RRH uses streams of digital IQ samples. Examples of such an approach are described in the Common Public Radio Interface (CPRI) and Open Base Station Architecture Initiative (OBSAI) families of specifications.

The master unit can be configured to use wideband interfaces or narrowband interfaces to the additional base stations. Also, the master unit can be configured to interface with the base stations using analog radio frequency (RF) interfaces or digital interfaces (for example, using a CPRI or OBSAI digital IQ interface). In some examples, the master unit interfaces with the additional base stations via one or more wireless interface nodes (not shown). A wireless interface node can be located, for example, at a base station hotel, and group a particular part of a RF installation to transfer to the master unit.

In examples where the master unit is configured to interface with one or more additional base stations using an analog RF interface (for example, either a traditional monolithic base station or via the analog RF interface of an RRH), the base stations can be coupled to the master unit using a network of attenuators, combiners, splitters, amplifiers, filters, cross-connects, etc., which is referred to collectively as a point-of-interface (POI). This is done so that, in the downlink, the desired set of RF carriers output by the base stations can be extracted, combined, and routed to the appropriate master unit, and so that, in the uplink, the desired set of carriers output by the master unit can be extracted, combined, and routed to the appropriate interface of each base station.

In examples where the master unit of the integrated relay distributed antenna system is configured to interface with one or more additional base stations using a digital interface (in addition to, or instead of) interfacing with one or more additional base stations via an analog RF interface, the master unit can be configured to interact directly with one or more BBUs using the digital IQ interface that is used for communicating between the BBUs and an RRHs (for example, using the CPRI serial digital IQ interface).

In examples where the master unit is coupled directly to the one or more additional base stations, the signals communicated with the additional base stations would be handled internally by the master unit and remote antenna units of the integrated relay distributed antenna system in a more conventional way compared to the signals communicated via the relay node. In particular, the signals communicated between the additional base stations and the UEs would not be demodulated and decoded as with the signals communicated via the relay node. In some examples, the DAS is configured to multiplex the signals communicated between the additional base stations and the UEs with the signals communicated via the relay node on a common digital interface.

The relay node, master unit, and the remote antenna units of the integrated relay distributed antenna systems can be configured to communicate using switched Ethernet links between the relay node, the master unit, and the remote antenna units. The integrated relay distributed antenna systems are configured to satisfy the time constraints of communication regardless of the type of communication links. By decoding/reencoding, the backhaul interface takes care of the timing between the base station and the relay node, and the access interface takes care of the low-level timing (for example, microsecond level). There is more flexibility in the timing given the lower data rates and reduced bandwidth required to transport the information, so the synchronous links typically required for previous distributed antenna systems are not required for the integrated relay distributed antenna system.

The integrated relay distributed antenna systems described above provide benefits over previous systems and provide new functionality not available with a single-point L1 repeater or relay with a distributed antenna system. For example, the relay node, master unit, and remote antenna units are able to communicate using a lower data rate by communicating the "demodulated and decoded" data and/or "demodulated" data. This enables the use of lower bandwidth and lower cost communication channels between the relay node, the master unit, and the remote antenna units. Also, compared to a single-point relay in combination with a typical distributed antenna system, some of the integrated relay distributed antenna system provide better signal quality by only providing uplink signals that are successfully demodulated and decoded.

In various aspects, system elements, method steps, or examples described throughout this disclosure (such as the relay nodes, master units, remote relay antenna units, remote antenna units, or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions, used for synchronization and fault management in a distributed antenna system.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Example Embodiments

Example 1 includes a distributed relay, comprising: a relay node master unit communicatively coupled to a base station; and one or more remote relay antenna units located remotely from the relay node master unit and communicatively coupled to the relay node master unit, wherein the relay node master unit is configured to communicate demodulated and decoded data and/or demodulated data with the one or more remote relay antenna units via one or more transport interfaces, wherein the one or more remote relay antenna units are configured to communicate radio frequency signals to a coverage zone via one or more antennas; wherein the relay node master unit comprises a backhaul interface and an access interface, wherein the backhaul interface is configured to implement communications between the relay node master unit and the base station, wherein the access interface is configured to implement communications between the one or more remote relay antenna units and user equipment.

Example 2 includes the distributed relay of Example 1, wherein the relay node master unit is configured to: down convert and analog-to-digital convert downlink signals received from the base station to generate downlink baseband data; demodulate and decode the downlink baseband data to generate demodulated and decoded downlink data; and provide the demodulated and decoded downlink data to the one or more remote relay antenna units; wherein the one or more remote relay antenna units are configured to: receive the demodulated and decoded downlink data from the relay node master unit; and encode, modulate, digital-to-analog convert, and upconvert the demodulated and decoded downlink data to generate the radio frequency signals for communication to the coverage area.

Example 3 includes the distributed relay of any of Examples 1-2, wherein the relay node master unit is configured to: down convert and analog-to-digital convert downlink signals received from the base station to generate downlink baseband data; demodulate and decode the downlink baseband data to generate demodulated and decoded downlink data; encode the demodulated and decoded downlink data to generate demodulated downlink data; and provide the demodulated downlink data to the one or more remote relay antenna units; wherein the one or more remote relay antenna units are configured to: receive the demodulated downlink data from the relay node master unit; and modulate, digital-to-analog convert, and upconvert the demodulated and decoded downlink data to generate the radio frequency signals for communication to the coverage area.

Example 4 includes the distributed relay of any of Examples 1-3, wherein the one or more remote relay antenna units include a first remote relay antenna unit and a second remote relay antenna unit, wherein the relay node master unit is configured to provide the demodulated and decoded downlink data and/or the demodulated downlink data to the first remote relay antenna unit and the second remote relay antenna unit, wherein the first remote relay antenna unit and the second remote relay antenna unit are configured to wirelessly simulcast resource blocks for a user equipment.

Example 5 includes the distributed relay of any of Examples 1-3, wherein the one or more remote relay antenna units includes a first remote relay antenna unit and a second remote relay antenna unit; wherein the relay node master unit is configured to provide first demodulated and decoded downlink data and/or first demodulated data to the first remote relay antenna unit that is specifically intended for user equipment in a coverage zone of the first remote relay antenna unit, wherein the first remote relay antenna unit is configured to wirelessly unicast resource blocks for the user equipment in the coverage zone of the first remote relay antenna unit; wherein the relay node master unit is configured to provide second demodulated and decoded downlink data and/or second demodulated data to the second remote relay antenna unit that is specifically intended for user equipment in a coverage zone of the second remote relay antenna unit, wherein the second remote relay antenna unit is configured to wirelessly unicast resource blocks for the user equipment in the coverage zone of the second remote relay antenna unit.

Example 6 includes the distributed relay of any of Examples 1-5, wherein the one or more remote relay antenna units are configured to: down convert and analog-to-digital convert uplink signals received from user equipment to generate uplink baseband data; demodulate and decode the uplink baseband data to produce demodulated and decoded uplink data; and provide the demodulated and decoded uplink data to the relay node master unit.

Example 7 includes the distributed relay of Example 6, wherein the one or more remote relay antenna units includes a first remote relay antenna unit and a second remote relay antenna unit, wherein the relay node master unit is configured to: compare the demodulated and decoded uplink data provided from the first remote relay antenna unit and the demodulated and decoded uplink data provided from the second remote relay antenna unit; determine whether the demodulated and decoded uplink data provided from the first remote relay antenna unit and the demodulated and decoded uplink data provided from the second remote relay antenna unit includes information from the same user equipment; and discard the demodulated and decoded uplink data provided from the second remote relay antenna unit when it is determined that the demodulated and decoded uplink data provided from the first remote relay antenna unit and the demodulated and decoded uplink data provided from the second remote relay antenna unit includes information from the same user equipment.

Example 8 includes the distributed relay of Example 6, wherein the one or more remote relay antenna units includes a first remote relay antenna unit and a second remote relay antenna unit, wherein the relay node master unit is configured to: compare the demodulated and decoded uplink data provided from the first remote relay antenna unit and the demodulated and decoded uplink data provided from the second remote relay antenna unit; determine whether the demodulated and decoded uplink data provided from the first remote relay antenna unit and the demodulated and decoded uplink data provided from the second remote relay antenna unit includes information from the same user equipment; and combine the demodulated and decoded uplink data from the first remote relay antenna unit and the second remote relay antenna unit when it is determined that the demodulated and decoded uplink data provided from the first remote relay antenna unit and the demodulated and decoded uplink data provided from the second remote relay antenna unit includes information from the same user equipment.

Example 9 includes the distributed relay of any of Examples 1-8, wherein the one or more remote relay antenna units are configured to: down convert and analog-to-digital convert uplink signals received from user equipment to generate uplink baseband data; demodulate the uplink baseband data to generate demodulated uplink data; and provide the demodulated uplink data to the relay node master unit.

Example 10 includes the distributed relay of any of Examples 1-9, wherein the relay node master unit is communicatively coupled to the base station via a donor antenna.

Example 11 includes the distributed relay of any of Examples 1-10, wherein the relay node master unit is communicatively coupled to the base station via a copper cable or optical fiber.

Example 12 includes the distributed relay of any of Examples 1-11, wherein the distributed relay is configured to communicate over a plurality of radio frequency channels, wherein the plurality of radio frequency channels is included in a single frequency band.

Example 13 includes the distributed relay of any of Examples 1-12, wherein the distributed relay is configured to communicate using a plurality of radio frequency bands.

Example 14 includes the distributed relay of any of Examples 1-13, wherein the relay node master unit is communicatively coupled to a plurality of base stations.

Example 15 includes a relay node master unit of a distributed relay, comprising: a backhaul interface configured to implement communication between the relay node master unit and a base station; an access interface configured to implement communication between the relay node master unit and one or more remote relay antenna units of the distributed relay, wherein the one or more remote relay antenna units are configured to provide radio frequency signals to a coverage zone via one or more antennas; one or more transport interfaces configured to output demodulated and decoded downlink data and/or demodulated downlink data to the one or more remote relay antenna units, wherein the one or more transport interfaces are configured to receive demodulated and decoded uplink data and/or demodulated uplink data from the one or more remote relay antenna units; and a controller configured to modify demodulated and decoded data and/or demodulated data exchanged between the backhaul interface and the access interface.

Example 16 includes the relay node master unit of Example 15, wherein the access interface is configured to: compare the demodulated and decoded uplink data provided from a first remote relay antenna unit and the demodulated and decoded uplink data provided from a second remote relay antenna unit; determine whether the demodulated and decoded uplink data provided from the first remote relay antenna unit and the demodulated and decoded uplink data provided from the second remote relay antenna unit includes information from the same user equipment; and discard the demodulated and decoded uplink data provided from the second remote relay antenna unit when it is determined that the demodulated and decoded uplink data provided from the first remote relay antenna unit and the demodulated and decoded uplink data provided from the second remote relay antenna unit includes information from the same user equipment.

Example 17 includes the relay node master unit of Example 15, wherein the access interface is configured to: compare the demodulated and decoded uplink data provided from a first remote relay antenna unit and the demodulated and decoded uplink data provided from a second remote relay antenna unit; determine whether the demodulated and decoded uplink data provided from the first remote relay antenna unit and the demodulated and decoded uplink data provided from the second remote relay antenna unit includes information from the same user equipment; and combine the demodulated and decoded uplink data from the first remote relay antenna unit and the second remote relay antenna unit when it is determined that the demodulated and decoded uplink data provided from the first remote relay antenna unit and the demodulated and decoded uplink data provided from the second remote relay antenna unit includes information from the same user equipment.

Example 18 includes the relay node master unit of any of Examples 15-17, wherein the one or more remote relay antenna units include a first remote relay antenna unit and a second remote relay antenna unit, wherein the relay node master unit is configured to provide the demodulated and decoded downlink data and/or the demodulated downlink data to the first remote relay antenna unit and the second remote relay antenna unit, wherein the first remote relay antenna unit and the second remote relay antenna unit are configured to wirelessly simulcast resource blocks for a user equipment.

Example 19 includes the relay node master unit of any of Examples 15-17, wherein the one or more remote relay antenna units includes a first remote relay antenna unit and a second remote relay antenna unit; wherein the relay node master unit is configured to provide first demodulated and decoded downlink data or first demodulated data to the first remote relay antenna unit that is specifically intended for user equipment in a coverage zone of the first remote relay antenna unit, wherein the first remote relay antenna unit is configured to wirelessly unicast resource blocks for the user equipment in the coverage zone of the first remote relay antenna unit; wherein the relay node master unit is configured to provide second demodulated and decoded downlink data or second demodulated data to the second remote relay antenna unit that is specifically intended for user equipment in a coverage zone of the second remote relay antenna unit, wherein the second remote relay antenna unit is configured to wirelessly unicast resource blocks for the user equipment in the coverage zone of the second remote relay antenna unit.

Example 20 includes the relay node master unit of any of Examples 15-19, wherein the relay node master unit is configured to communicate over a plurality of radio frequency channels, wherein the plurality of radio frequency channels is included in a single frequency band.

Example 21 includes the relay node master unit of any of Examples 15-20, wherein the relay node master unit is configured to communicate using a plurality of radio frequency bands.

Example 22 includes a remote relay antenna unit of a distributed relay, comprising: an access interface configured to implement communication between the remote relay antenna unit, user equipment, and a relay node master unit of the distributed relay, wherein the access interface is configured to receive and transmit radio frequency signals in a coverage zone via one or more antennas; a transport interface configured to output demodulated and decoded data and/or demodulated uplink data to the relay node master unit, wherein the transport interface is configured to receive demodulated and decoded downlink data and/or demodulated downlink data from the relay node master unit; and an antenna port.

Example 23 includes the remote relay antenna unit of Example 22, wherein the remote relay antenna unit is configured to communicate only successfully demodulated and decoded uplink data to the relay node master unit.

Example 24 includes the remote relay antenna unit of Example 23, wherein the remote relay antenna unit is configured to attempt to demodulate and decode uplink baseband data for resource blocks for all user equipment.

Example 25 includes the remote relay antenna unit of Example 23, wherein the remote relay antenna unit is configured to only attempt to demodulate and decode uplink baseband data for resource blocks for user equipment within a threshold distance of the remote relay antenna unit.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A distributed relay, comprising:
a relay node master unit communicatively coupled to a base station, wherein the relay node master unit is configured to demodulate and decode downlink signals from the base station to recover control-plane and user-plane data; and
one or more remote relay antenna units located remotely from the relay node master unit and communicatively coupled to the relay node master unit, wherein the one or more remote relay antenna units are configured to demodulate uplink signals from user equipment in a coverage zone to recover encoded data communicated in accordance with a modulation scheme;
wherein the relay node master unit is configured to communicate demodulated and decoded data and/or demodulated data with the one or more remote relay antenna units via one or more transport interfaces, wherein the one or more remote relay antenna units are configured to communicate radio frequency signals to the coverage zone via one or more antennas;
wherein the relay node master unit comprises a backhaul interface and an access interface, wherein the backhaul interface is configured to implement communications between the relay node master unit and the base station, wherein the access interface is configured to implement communications between the one or more remote relay antenna units and user equipment.

2. The distributed relay of claim 1, wherein the relay node master unit is configured to:
down convert and analog-to-digital convert downlink signals received from the base station to generate downlink baseband data;
demodulate and decode the downlink baseband data to generate demodulated and decoded downlink data; and
provide the demodulated and decoded downlink data to the one or more remote relay antenna units;
wherein the one or more remote relay antenna units are configured to:
receive the demodulated and decoded downlink data from the relay node master unit; and
encode, modulate, digital-to-analog convert, and upconvert the demodulated and decoded downlink data to generate the radio frequency signals for communication to the coverage zone.

3. The distributed relay of claim 1, wherein the relay node master unit is configured to:
down convert and analog-to-digital convert downlink signals received from the base station to generate downlink baseband data;
demodulate and decode the downlink baseband data to generate demodulated and decoded downlink data;
encode the demodulated and decoded downlink data to generate demodulated downlink data; and
provide the demodulated downlink data to the one or more remote relay antenna units;
wherein the one or more remote relay antenna units are configured to:
receive the demodulated downlink data from the relay node master unit; and
modulate, digital-to-analog convert, and upconvert the demodulated downlink data to generate the radio frequency downlink signals for communication to the coverage zone.

4. The distributed relay of claim 1, wherein the one or more remote relay antenna units include a first remote relay antenna unit and a second remote relay antenna unit, wherein the relay node master unit is configured to provide the demodulated and decoded downlink data and/or the demodulated downlink data to the first remote relay antenna unit and the second remote relay antenna unit, wherein the first remote relay antenna unit and the second remote relay antenna unit are configured to wirelessly simulcast resource blocks for a user equipment.

5. The distributed relay of claim 1, wherein the one or more remote relay antenna units includes a first remote relay antenna unit and a second remote relay antenna unit;
wherein the relay node master unit is configured to provide first demodulated and decoded downlink data and/or first demodulated data to the first remote relay antenna unit that is specifically intended for user equipment in a coverage zone of the first remote relay antenna unit, wherein the first remote relay antenna unit is configured to wirelessly unicast resource blocks for the user equipment in the coverage zone of the first remote relay antenna unit;
wherein the relay node master unit is configured to provide second demodulated and decoded downlink data and/or second demodulated data to the second remote relay antenna unit that is specifically intended for user equipment in a coverage zone of the second remote relay antenna unit, wherein the second remote relay antenna unit is configured to wirelessly unicast resource blocks for the user equipment in the coverage zone of the second remote relay antenna unit.

6. The distributed relay of claim 1, wherein the one or more remote relay antenna units are configured to:
down convert and analog-to-digital convert uplink signals received from user equipment to generate uplink baseband data;
demodulate and decode the uplink baseband data to produce demodulated and decoded uplink data; and
provide the demodulated and decoded uplink data to the relay node master unit.

7. The distributed relay of claim 6, wherein the one or more remote relay antenna units includes a first remote relay antenna unit and a second remote relay antenna unit, wherein the relay node master unit is configured to:
compare the demodulated and decoded uplink data provided from the first remote relay antenna unit and the demodulated and decoded uplink data provided from the second remote relay antenna unit;
determine whether the demodulated and decoded uplink data provided from the first remote relay antenna unit and the demodulated and decoded uplink data provided from the second remote relay antenna unit includes information from the same user equipment; and
discard the demodulated and decoded uplink data provided from the second remote relay antenna unit when it is determined that the demodulated and decoded uplink data provided from the first remote relay antenna unit and the demodulated and decoded uplink data provided from the second remote relay antenna unit includes information from the same user equipment.

8. The distributed relay of claim 6, wherein the one or more remote relay antenna units includes a first remote relay antenna unit and a second remote relay antenna unit, wherein the relay node master unit is configured to:
compare the demodulated and decoded uplink data provided from the first remote relay antenna unit and the demodulated and decoded uplink data provided from the second remote relay antenna unit;
determine whether the demodulated and decoded uplink data provided from the first remote relay antenna unit and the demodulated and decoded uplink data provided from the second remote relay antenna unit includes information from the same user equipment; and
combine the demodulated and decoded uplink data from the first remote relay antenna unit and the second remote relay antenna unit when it is determined that the demodulated and decoded uplink data provided from the first remote relay antenna unit and the demodulated and decoded uplink data provided from the second remote relay antenna unit includes information from the same user equipment.

9. The distributed relay of claim 1, wherein the one or more remote relay antenna units are configured to:
down convert and analog-to-digital convert uplink signals received from user equipment to generate uplink baseband data;
demodulate the uplink baseband data to generate demodulated uplink data; and
provide the demodulated uplink data to the relay node master unit.

10. The distributed relay of claim 1, wherein the relay node master unit is communicatively coupled to the base station via a donor antenna.

11. The distributed relay of claim 1, wherein the relay node master unit is communicatively coupled to the base station via a copper cable or optical fiber.

12. The distributed relay of claim 1, wherein the distributed relay is configured to communicate over a plurality of radio frequency channels, wherein the plurality of radio frequency channels is included in a single frequency band.

13. The distributed relay of claim 1, wherein the distributed relay is configured to communicate using a plurality of radio frequency bands.

14. The distributed relay of claim 1, wherein the relay node master unit is communicatively coupled to a plurality of base stations.

15. A relay node master unit of a distributed relay, comprising:
- a backhaul interface configured to implement communication between the relay node master unit and a base station, wherein the backhaul interface includes one or more circuits configured to demodulate and decode downlink signals from the base station to recover control-plane and user-plane data;
- an access interface configured to implement communication between the relay node master unit and one or more remote relay antenna units of the distributed relay, wherein the one or more remote relay antenna units are configured to provide radio frequency signals to a coverage zone via one or more antennas;
- one or more transport interfaces configured to output demodulated and decoded downlink data and/or demodulated downlink data to the one or more remote relay antenna units, wherein the one or more transport interfaces are configured to receive demodulated and decoded uplink data and/or demodulated uplink data from the one or more remote relay antenna units; and
- a controller configured to modify demodulated and decoded data and/or demodulated data exchanged between the backhaul interface and the access interface.

16. The relay node master unit of claim 15, wherein the access interface is configured to:
- compare the demodulated and decoded uplink data provided from a first remote relay antenna unit and the demodulated and decoded uplink data provided from a second remote relay antenna unit;
- determine whether the demodulated and decoded uplink data provided from the first remote relay antenna unit and the demodulated and decoded uplink data provided from the second remote relay antenna unit includes information from the same user equipment; and
- discard the demodulated and decoded uplink data provided from the second remote relay antenna unit when it is determined that the demodulated and decoded uplink data provided from the first remote relay antenna unit and the demodulated and decoded uplink data provided from the second remote relay antenna unit includes information from the same user equipment.

17. The relay node master unit of claim 15, wherein the access interface is configured to:
- compare the demodulated and decoded uplink data provided from a first remote relay antenna unit and the demodulated and decoded uplink data provided from a second remote relay antenna unit;
- determine whether the demodulated and decoded uplink data provided from the first remote relay antenna unit and the demodulated and decoded uplink data provided from the second remote relay antenna unit includes information from the same user equipment; and
- combine the demodulated and decoded uplink data from the first remote relay antenna unit and the second remote relay antenna unit when it is determined that the demodulated and decoded uplink data provided from the first remote relay antenna unit and the demodulated and decoded uplink data provided from the second remote relay antenna unit includes information from the same user equipment.

18. The relay node master unit of claim 15, wherein the one or more remote relay antenna units include a first remote relay antenna unit and a second remote relay antenna unit, wherein the relay node master unit is configured to provide the demodulated and decoded downlink data and/or the demodulated downlink data to the first remote relay antenna unit and the second remote relay antenna unit, wherein the first remote relay antenna unit and the second remote relay antenna unit are configured to wirelessly simulcast resource blocks for a user equipment.

19. The relay node master unit of claim 15, wherein the one or more remote relay antenna units includes a first remote relay antenna unit and a second remote relay antenna unit;
- wherein the relay node master unit is configured to provide first demodulated and decoded downlink data or first demodulated data to the first remote relay antenna unit that is specifically intended for user equipment in a coverage zone of the first remote relay antenna unit, wherein the first remote relay antenna unit is configured to wirelessly unicast resource blocks for the user equipment in the coverage zone of the first remote relay antenna unit;
- wherein the relay node master unit is configured to provide second demodulated and decoded downlink data or second demodulated data to the second remote relay antenna unit that is specifically intended for user equipment in a coverage zone of the second remote relay antenna unit, wherein the second remote relay antenna unit is configured to wirelessly unicast resource blocks for the user equipment in the coverage zone of the second remote relay antenna unit.

20. The relay node master unit of claim 15, wherein the relay node master unit is configured to communicate over a plurality of radio frequency channels, wherein the plurality of radio frequency channels is included in a single frequency band.

21. The relay node master unit of claim 15, wherein the relay node master unit is configured to communicate using a plurality of radio frequency bands.

22. A remote relay antenna unit of a distributed relay, comprising:
- an access interface configured to implement communication between the remote relay antenna unit, user equipment, and a relay node master unit of the distributed relay, wherein the access interface is configured to receive and transmit radio frequency signals in a coverage zone via one or more antennas, wherein the access interface includes one or more circuits configured to demodulate uplink signals from user equipment in the coverage zone to recover encoded data communicated in accordance with a modulation scheme;
- a transport interface configured to output demodulated and decoded data and/or demodulated uplink data to the relay node master unit, wherein the transport interface is configured to receive demodulated and decoded downlink data and/or demodulated downlink data from the relay node master unit; and
- an antenna port.

23. The remote relay antenna unit of claim 22, wherein the remote relay antenna unit is configured to communicate only successfully demodulated and decoded uplink data to the relay node master unit.

24. The remote relay antenna unit of claim 23, wherein the remote relay antenna unit is configured to attempt to demodulate and decode uplink baseband data for resource blocks for all user equipment.

25. The remote relay antenna unit of claim 23, wherein the remote relay antenna unit is configured to only attempt to demodulate and decode uplink baseband data for resource blocks for user equipment within a threshold distance of the remote relay antenna unit.

\* \* \* \* \*